US009454480B2

(12) United States Patent
Joshua et al.

(10) Patent No.: US 9,454,480 B2
(45) Date of Patent: Sep. 27, 2016

(54) INTERCONNECTED RING NETWORK IN A MULTI-PROCESSOR SYSTEM

(71) Applicant: Marvell World Trade Ltd., St. Michael (BB)

(72) Inventors: Eitan Joshua, Ramot Menashe (IL); Erez Amit, Chandler, AZ (US); Shaul Chapman, Alonei Aba (IL); Sujat Jamil, Gilbert, AZ (US); Frank O'Bleness, Tempe, AZ (US)

(73) Assignee: Marvell World Trade Ltd., St. Michael (BB)

( * ) Notice: Subject to any disclaimer, the term of this patent is extended or adjusted under 35 U.S.C. 154(b) by 1 day.

(21) Appl. No.: 14/161,397

(22) Filed: Jan. 22, 2014

(65) Prior Publication Data

US 2014/0201445 A1    Jul. 17, 2014

Related U.S. Application Data

(62) Division of application No. 14/155,773, filed on Jan. 15, 2014.

(60) Provisional application No. 61/753,091, filed on Jan. 16, 2013, provisional application No. 61/753,094, filed on Jan. 16, 2013.

(51) Int. Cl.
| | |
|---|---|
| *G06F 12/0813* | (2016.01) |
| *G06F 12/08* | (2016.01) |
| *G06F 13/16* | (2006.01) |
| *G06F 15/173* | (2006.01) |

(52) U.S. Cl.
CPC ....... *G06F 12/0813* (2013.01); *G06F 12/0815* (2013.01); *G06F 13/1657* (2013.01); *G06F 15/17375* (2013.01)

(58) Field of Classification Search
None
See application file for complete search history.

(56) References Cited

U.S. PATENT DOCUMENTS

| | | | |
|---|---|---|---|
| 5,590,117 A | 12/1996 | Iida et al. | |
| 6,081,868 A | 6/2000 | Brooks | |
| 2003/0212830 A1* | 11/2003 | Greenblat et al. | 709/251 |
| 2006/0248287 A1* | 11/2006 | Buyuktosunoglu et al. | 711/146 |
| 2010/0161558 A1 | 6/2010 | Goldberg et al. | |
| 2010/0299481 A1 | 11/2010 | Conte et al. | |
| 2011/0138128 A1* | 6/2011 | Chen | G06F 12/0817 711/130 |
| 2011/0153946 A1 | 6/2011 | Solihin | |
| 2012/0151152 A1* | 6/2012 | Minami et al. | 711/146 |
| 2012/0195321 A1 | 8/2012 | Ramanujam et al. | |
| 2012/0260056 A1 | 10/2012 | Hikichi et al. | |
| 2013/0268711 A1* | 10/2013 | Safranek et al. | 710/308 |
| 2014/0201326 A1 | 7/2014 | Joshua et al. | |
| 2014/0201443 A1 | 7/2014 | Joshua et al. | |
| 2014/0201444 A1 | 7/2014 | Joshua et al. | |
| 2014/0201472 A1 | 7/2014 | Joshua et al. | |

\* cited by examiner

*Primary Examiner* — Jared Rutz
*Assistant Examiner* — Charles Choi

(57) ABSTRACT

In various embodiments, the present disclosure provides a system comprising a first plurality of processing cores, ones of the first plurality of processing cores coupled to a respective core interface module among a first plurality of core interface modules, the first plurality of core interface modules configured to be coupled to form in a first ring network of processing cores; a second plurality of processing cores, ones of the second plurality of processing cores coupled to a respective core interface module among a second plurality of core interface modules, the second plurality of core interface modules configured to be coupled to form a second ring network of processing cores; a first global interface module to form an interface between the first ring network and a third ring network; and a second global interface module to form an interface between the second ring network and the third ring network.

20 Claims, 15 Drawing Sheets

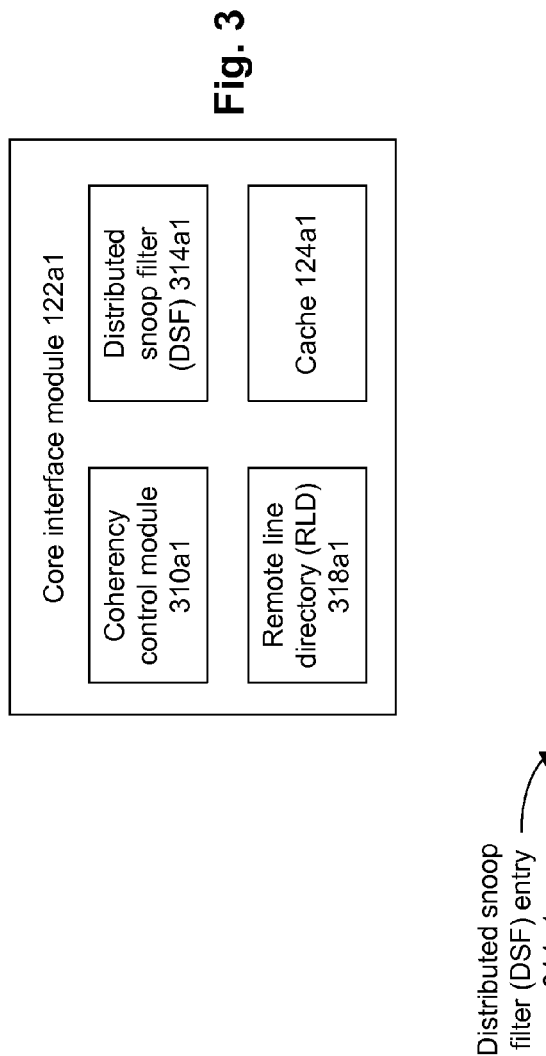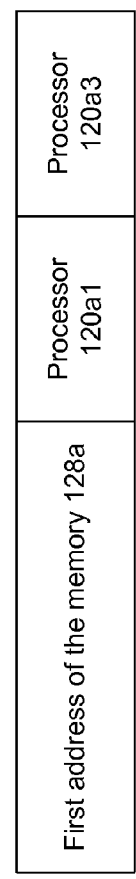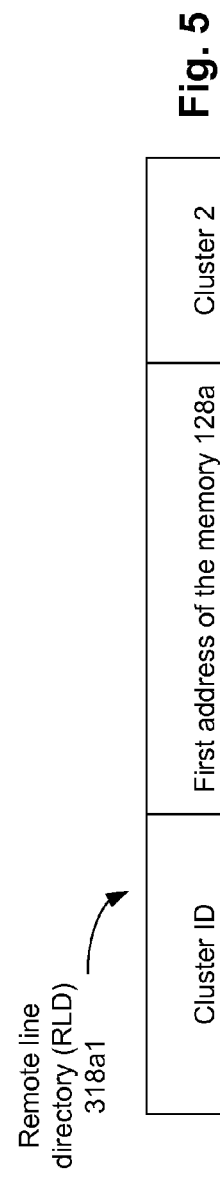

INTERCONNECTED RING NETWORK IN A MULTI-PROCESSOR SYSTEM

CROSS REFERENCE TO RELATED APPLICATIONS

The present disclosure is a divisional of and claims priority to U.S. patent application Ser. No. 14/155,773, filed Jan. 15, 2014, which claims priority to U.S. Provisional Patent Application No. 61/753,091, filed Jan. 16, 2013, and to U.S. Provisional Patent Application No. 61/753,094, filed Jan. 16, 2013, the entire specifications of which are hereby incorporated by reference.

TECHNICAL FIELD

Embodiments of the present disclosure relate to a computing system, and more specifically, to architecture of a multi-processor system.

BACKGROUND

Unless otherwise indicated herein, the approaches described in this section are not prior art to the claims in the present disclosure and are not admitted to be prior art by inclusion in this section.

A multi-processor system generally comprises a plurality of processors. A multi-processor system can also comprise a plurality of caches. In an example, a cache can be accessed only by a corresponding single processor of the plurality of processors. In another example, the cache can be shared, i.e., can be accessed by more than one of the plurality of processors.

SUMMARY

In various embodiments, the present disclosure provides a system comprising a first plurality of processing cores, ones of the first plurality of processing cores coupled to a respective core interface module among a first plurality of core interface modules, the first plurality of core interface modules configured to be coupled to form in a first ring network of processing cores; a second plurality of processing cores, ones of the second plurality of processing cores coupled to a respective core interface module among a second plurality of core interface modules, the second plurality of core interface modules configured to be coupled to form a second ring network of processing cores; a first global interface module configured to form an interface between the first ring network and a third ring network by transmitting data between the first ring network and the third ring network, the third ring network interconnecting the first ring network and the second ring network; and a second global interface module configured to form an interface between the second ring network and the third ring network by transmitting data between the second ring network and the third ring network.

In various embodiments, the present disclosure also provides a method comprising communicating, by ones of a first plurality of processing cores coupled to a respective one of a first plurality of core interface modules, with the respective core interface module of the first plurality of core interface modules, the first plurality of core interface modules being arranged in a first ring network; communicating, by ones of a second plurality of processing cores coupled to a respective ones of a second plurality of core interface modules, with the respective core interface module of the second plurality of core interface modules, the second plurality of core interface modules arranged in a second ring network; interfacing, by a first global interface module, between the first ring network and a third ring network by transmitting data between the first ring network and the third ring network, the third ring network interconnecting the first ring network and the second ring network; and interfacing, by a second global interface module, between the second ring network and a third ring network by transmitting data between the second ring network and the third ring network.

In various embodiments, the present disclosure also provides a system comprising a plurality of processing cores; a plurality of core interface modules, wherein ones of the plurality of processing cores are coupled to a respective core interface module of the plurality of core interface modules; a plurality of caches, wherein ones of the plurality of core interface modules comprises or is coupled to a respective cache of the plurality of caches; a memory; and a memory interface module coupled to the memory, the memory interface module and the plurality of core interface modules being configured as a first ring network, ones of the plurality of core interface modules configured to interface the respective processing core to the first ring network by transmitting data between the respective processing core and the first ring network, and the memory interface module configured to interface the memory to the first ring network by transmitting data between the memory and the first ring network.

In various embodiments, the present disclosure also provides a method comprising communicating, by ones of a plurality of processing cores coupled to a respective one of a plurality of core interface modules, with the respective core interface module of the plurality of core interface modules; communicating, by ones of the plurality of core interface modules coupled to a respective one of a plurality of caches, with the respective cache of the plurality of caches; and communicating, by a memory interface module, with a memory that is coupled to the memory interface, the memory interface module and the plurality of core interface modules being configured as a first ring network, ones of the plurality of core interface modules configured to interface the respective processing core to the first ring network by transmitting data between the respective processing core and the first ring network, and the memory interface module configured to interface the memory to the first ring network by transmitting data between the memory and the first ring network.

In various embodiments, the present disclosure also provides a method comprising communicating by ones of a plurality of processing cores with a respective core interface module of a plurality of core interface modules, the plurality of core interface modules being configured as a first ring network, wherein ones of the plurality of core interface modules are coupled to a corresponding cache of a plurality of caches; receiving, by a first core interface module of the plurality of core interface modules from a corresponding first processing core of the plurality of processing cores, a transaction request to read data; checking, by the first core interface module, if the data to be read is cached in a first cache that is coupled to the first core interface module; and while checking if the data to be read is cached in the first cache, transmitting, by the first core interface module, the transaction request to a second core interface module to check if the data to be read is cached in a second cache that is coupled to the second core interface module.

In various embodiments, the present disclosure also provides a system comprising a plurality of processing cores; and a plurality of core interface modules, ones of the plurality of processing cores coupled to a respective core interface module of the plurality of core interface modules, wherein ones of the plurality of core interface modules is associated with a respective cache of a plurality of caches, wherein a first core interface module of the plurality of core interface modules is coupled to a corresponding first processing core of the plurality of processing cores, wherein the plurality of core interface modules is configured as a first ring network, wherein the first core interface module is configured to receive, from the first processing core, a transaction request to read data, check to determine if the data to be read is cached in a first cache that is coupled to the first core interface module, and while checking to determine if the data to be read is cached in the first cache, transmit the transaction request to a second core interface module to check if the data to be read is cached in a second cache that is coupled to the second core interface module.

In various embodiments, the present disclosure also provides a method comprising communicating, by ones of a first plurality of processing cores coupled to a respective one of a first plurality of core interface modules, with the respective core interface module of the first plurality of core interface modules, the first plurality of core interface modules being arranged in a first ring network, ones of the first plurality of core interface modules configured to interface the respective processing core to the first ring network by transmitting data between the respective processing core and the first ring network; communicating, by ones of a second plurality of processing cores coupled to a respective ones of a second plurality of core interface modules, with the respective core interface module of the second plurality of core interface modules, the second plurality of core interface modules being arranged in a second ring network, ones of the second plurality of core interface modules configured to interface the respective processing core to the second ring network by transmitting data between the respective processing core and the second ring network; interfacing, by a global ring network, between the first ring network and the second ring network; receiving, by a first core interface module of the first plurality of core interface modules from a corresponding first processing core of the first plurality of processing cores, a transaction request to read data, a first cache being coupled to the first core interface module; and transmitting, by the first core interface module, the transaction request to a second core interface module of the first plurality of core interface modules to check if the data to be read is cached in a second cache that is coupled to the second core interface module.

In various embodiments, the present disclosure also provides a system comprising a first plurality of processing cores; a first plurality of core interface modules, ones of the first plurality of processing cores coupled to a respective core interface module of the first plurality of core interface modules, the first plurality of core interface modules being arranged in a first ring network, ones of the first plurality of core interface modules configured to interface the respective processing core of the first plurality of processing cores to the first ring network by transmitting data between the respective processing core and the first ring network; a second plurality of processing cores; a second plurality of core interface modules, ones of the second plurality of processing cores coupled to a respective core interface module of the second plurality of core interface modules, the second plurality of core interface modules being arranged in a second ring network, ones of the second plurality of core interface modules configured to interface the respective processing core of the second plurality of processing cores to the second ring network by transmitting data between the respective processing core and the second ring network; and a global ring network configured to interface between the first ring network and the second ring network, wherein a first core interface module of the first plurality of core interface modules is configured to receive, from a corresponding first processing core of the first plurality of processing cores, a transaction request to read data, a first cache being coupled to the first core interface module, and transmit, by the first core interface module, the transaction request to a second core interface module of the first plurality of core interface modules to check if the data to be read is cached in a second cache that is coupled to the second core interface module.

In various embodiments, the present disclosure also provides a system comprising a memory; and a memory interface module coupled to the memory, the memory interface module configured to control access to the memory, the memory interface module comprising a request combination module configured to: receive a first memory access request to access data stored in the memory; receive a second memory access request to access data stored in the memory; based on the first and second memory access requests, generate a third memory access request; and based on the third memory access request, access the memory to read data from the memory.

In various embodiments, the present disclosure provides a method comprising receiving, by a memory interface module coupled to a memory, a first memory access request to access data stored in the memory, the memory interface module configured to control access to the memory; receiving, by the memory interface module, a second memory access request to access data stored in the memory; based on the first and second memory access requests, generating a third memory access request; and based on the third memory access request, accessing the memory to read data from the memory.

BRIEF DESCRIPTION OF THE DRAWINGS

In the following detailed description, reference is made to the accompanying drawings which form a part hereof wherein like numerals designate like parts throughout, and in which is shown by way of embodiments that illustrate principles of the present disclosure. It is noted that other embodiments may be utilized and structural or logical changes may be made without departing from the scope of the present disclosure. Therefore, the following detailed description is not to be taken in a limiting sense, and the scope of embodiments in accordance with the present disclosure is defined by the appended claims and their equivalents.

FIG. 3 illustrates an example core interface module.

FIG. 4 illustrates an example of contents stored in an entry of an example distributed snoop filter.

FIG. 5 illustrates an example remote line directory.

DETAILED DESCRIPTION

Figure 1:
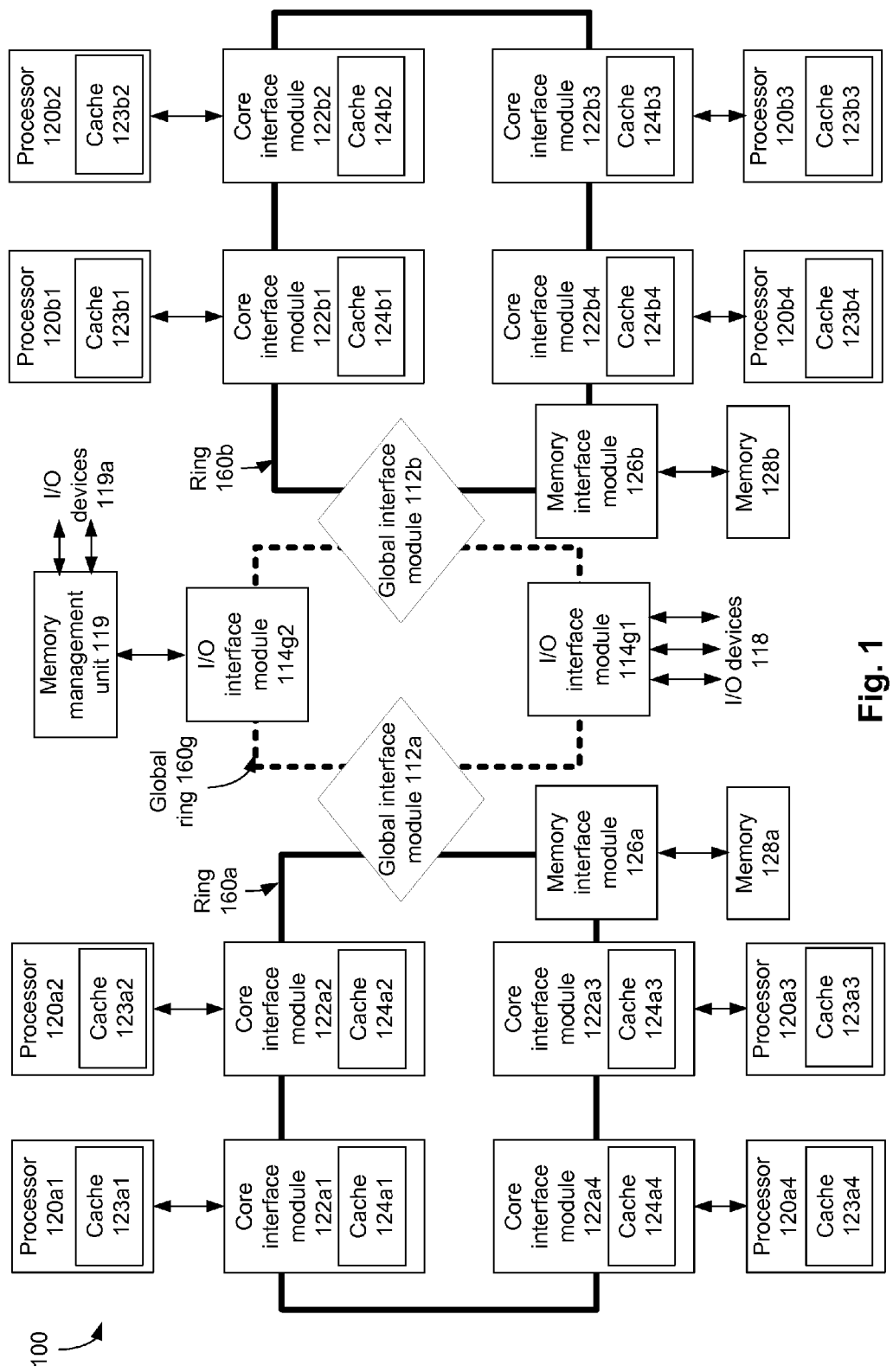
FIG. 1 schematically illustrates a multi-core processing system comprising a plurality of processing cores arranged in a plurality of ring networks.

FIG. 1 schematically illustrates a multi-core processing system 100 (henceforth referred to as "system 100") comprising a plurality of processing cores arranged in a plurality of ring networks (a "processing core" is also referred to herein as a "processor"). The plurality of processors includes a first plurality of processors $120a1, \ldots, 120a4$, and a second plurality of processors $120b1, \ldots, 120b4$. In an embodiment, ones of the plurality of processors are coupled to a respective core interface module. For example, each of the processors $120a1, \ldots, 120a4, 120b1, \ldots, 120b4$ is respectively coupled to a corresponding one of core interface modules $122a1, \ldots, 122a4, 122b1, \ldots, 122b4$. In an embodiment, each core interface module comprises (or is coupled to) a corresponding cache. For example, the core interface module $122a1$ comprises a corresponding cache $124a1$, the core interface module $122b1$ comprises a corresponding cache $124b1$, and so on.

In an embodiment, the core interface modules $122a1, \ldots, 122a4$ are arranged in a first ring network $160a$ (a "ring network" henceforth is also referred to as a "ring"), and the core interface modules $122b1, \ldots, 122b4$ are arranged in a second ring $160b$. For example, the core interface modules $122a1, \ldots, 122a4$ are coupled or linked using one or more communication links (along with various other components of the system 100, as illustrated in FIG. 1) to form the ring $160a$. Similarly, the core interface modules $122b1, \ldots, 122b4$ are coupled or linked using one or more communication links (along with various other components of the system 100, as illustrated in FIG. 1) to form the ring $160b$. Each core interface module forms an interface between the corresponding processor and the corresponding ring. For example, the core interface module $122a1$ forms an interface between the corresponding processor $120a1$ and the corresponding ring $160a$, the core interface module $120b1$ forms an interface between the corresponding processor $120b1$ and the corresponding ring $160b$, and so on.

In an embodiment, a global ring $160g$ (e.g., illustrated using dotted lines in FIG. 1) interconnects the rings $160a$ and $160b$. For example, the global ring $160g$ forms an interface between the rings $160a$ and $160b$. The global ring $160g$ comprises a global interface module $112a$ configured to interface between the ring $160a$ and the global ring $160g$. The global ring $160g$ further comprises a global interface module $112b$ configured to interface between the ring $160b$ and the global ring $160g$. In an example, the global interface modules $112a$ and $112b$ are coupled or linked using one or more communication links (along with various other components of the system 100, as illustrated in FIG. 1) to form the global ring $160g$. To differentiate the rings $160a$ and $160b$ from the global ring $160g$, each of the rings $160a$ and $160b$ is also referred to herein as a local ring. Thus, in an embodiment, a local ring comprises (i) one or more core interface modules and (ii) at least one global interface module (for example, to interface the local ring to the global ring). In an embodiment, a global ring comprises one or more global interface modules to interface with one or more corresponding local rings.

In an embodiment, the system 100 comprises caches $123a1, \ldots, 123b4$, as illustrated in FIG. 1. For example, ones of the processors $120a1, \ldots, 120b4$ comprise (or is coupled to) a respective ones of caches $123a1, \ldots, 123b4$. For example, the processor $120a1$ comprises (or is coupled to) the cache $123a1$, the processor $120b1$ comprises (or is coupled to) the cache $123b1$, and so on. In an embodiment, the caches $123a1, \ldots, 123b4$ are, for example, level 1 (L1) cache, level 2 (L2) cache, and/or the like. In an example, the cache $123a1$ can be accessed by the processor $120a1$ directly, for instance, without interfacing with any of the rings of the system 100 (for example, by bypassing any of the rings of the system 100). In an example, one or more of the caches $123a1, \ldots, 123b4$ cache data from one or more memories of the system 100 (for example, memories $128a$, $128b$, or the like).

In an embodiment, the caches $124a1, \ldots, 124b4$ are, for example, level 1 (L1) cache, level 2 (L2) cache, last level cache (LLC), and/or the like. In an example, the cache $124a1$ is accessible by the processor $120a1$ directly, e.g., by bypassing any of the rings 160 of the system 100. As will be discussed in detail herein, for example, the cache $124a1$ is also accessible by the processor $120a3$ via the ring $160a$; and the cache $124a1$ is also accessible by the processor $120b1$ via the rings $160a$ and $160b$, and the global ring $160g$. As such, in embodiments described herein, access to any given cache in system 100 is hierarchical in the sense that the cache is accessible to any processor in system 100, whether directly or by way of communication over one or more rings 160.

In an embodiment, each of the rings $160a$ and $160b$ comprises one or more corresponding memory interface modules. For example, the ring $160a$ comprises a memory interface module $126a$, and the ring $160b$ comprises a memory interface module $126b$. The memory interface modules $126a$ and $126b$ are respectively coupled to memories $128a$ and $128b$. The memory interface module $126a$ forms an interface between the memory $128a$ and the ring $160a$, and the memory interface module $126b$ forms an interface between the memory $128b$ and the ring $160b$. Ones of the memories $128a$, $128b$ are, for example, a random access memory (RAM), a double data rate synchronous dynamic random-access memory (DDR SDRAM), or the like. In an embodiment, the caches $124a1, \ldots, 124b3$ selectively cache data from the memories $128a$ and $128b$, as will be discussed in detail herein below. In an embodiment, data of, for example, a first memory address of the memory $128a$ can be cached in one or more caches of the local rings $160a$ and/or $160b$, as will be discussed in detail herein below.

In an embodiment, the system 100 further comprises one or more input/output (I/O) interface modules. For example, the global ring $160g$ comprises I/O interface modules $114g1$ and $114g2$. Although not illustrated in FIG. 1, in an embodiment, one or both of the local rings $160a$ and $160b$ also comprise one or more corresponding I/O interface modules. In an embodiment, an I/O interface module forms an interface between the associated ring and one or more I/O devices. For example, the I/O interface module $114g1$ forms an interface between the global ring $160g$ and one or more I/O devices 118 (e.g., one or more I/O peripheral devices). In another example, the I/O interface module $114g2$ forms an interface between the global ring $160g$ and a memory management unit 119. The memory management unit 119 is, for example, a virtual memory system architect (VMSA) component that translates and exhibits security protection on I/O transactions. In an example, the virtual memory system architect (VMSA) component translates addresses between a virtual address space and a physical space, and/or exhibits security protection. In an example, the memory management unit 119 is coupled to one or more I/O devices (for example, one or more I/O devices, labeled as I/O devices 119a in FIG. 1), and exchanges data with the I/O devices 119a, as illustrated in FIG. 1.

Unless otherwise mentioned and for the purposes of this disclosure, an interface module refers to one of a core interface module, a global interface module, a memory interface module, and/or an I/O interface module.

Unless otherwise indicated, a cluster refers to a corresponding local ring and various components associated with the local ring. For example, a first cluster refers to the local ring 160a, and various components associated with the local ring 160a (for example, the core interface modules 122a1, . . . , 122a4, the processors 120a1, . . . , 120a4, the memory interface module 126a coupled to the local ring 160a, the memory 128a coupled to the memory interface module 126a, and the like). Similarly, a second cluster refers to the local ring 160b, and various components associated with the local ring 160b (i.e., the core interface modules 122b1, . . . , 122b4, the processors 120b1, . . . , 120b4, the memory interface module 126b coupled to the local ring 160b, the memory 128b coupled to the memory interface module 126b, and the like).

Although FIG. 1 illustrates each of the rings 160a and 160b comprising four respective core interface modules (and four associated processors), in another embodiment, one or both of the rings 160a and 160b comprise any different number of core interface modules (and corresponding number of associated processors).

In an embodiment and as discussed, ones of the processors 120a1, . . . , 120b4 represents a corresponding processing core. However, in another embodiment, a processor of the system 100 of FIG. 1 represents more than one processing core. As an example, the processor 120a1 represents a group or cluster of processing cores. In such an example, the cluster of processing cores (that is represented by the processor 120a1) is coupled to the local ring 160a via the core interface module 122a1, and the cluster of processing cores adheres to protocols associated with the corresponding core interface module.

In an embodiment, the system 100 is located in an integrated circuit chip. For example, the system 100 is a part of a system-on-chip (SoC). In another embodiment, a first section of the system 100 (for example, various components associated with the local ring 160a) is located in a first integrated circuit chip, and a second section of the system 100 (for example, various components associated with the local ring 160b) is located in one or more other integrated circuit chips. In such an embodiment, for example, some sections of the global ring 160g (e.g., the global interface module 112a) is located in the first integrated circuit chip, while other sections of the global ring 160g (e.g., the global interface module 112b) is located in the one or more other integrated circuit chips.

Figure 2:
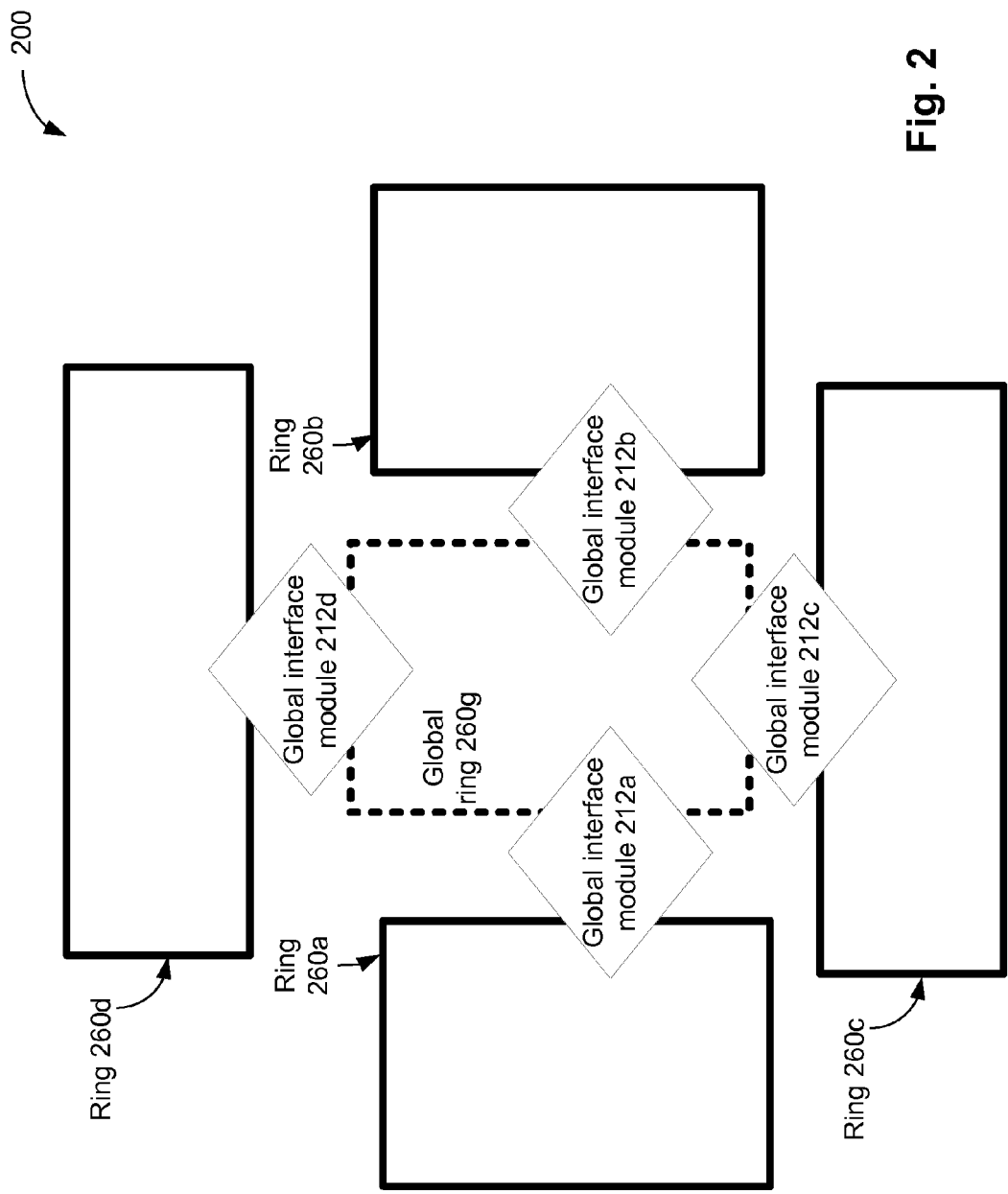
FIG. 2 illustrates a system comprising a global ring interconnecting a plurality of local rings.

Although FIG. 1 illustrates the global ring 160g interfacing two local rings 160a and 160b, in another embodiment, the global ring 160g interfaces more than two rings. For example, FIG. 2 illustrates a system 200 comprising a global ring 260g interconnecting local rings 260a, . . . , 260d. The global ring 260g comprises global interface modules 212a, . . . , 212d, that are respectively interconnected with the local rings 260a, . . . , 260d. Although each of the rings 260a, . . . , 260d and the global ring 260g comprises various other components (e.g., similar to the rings 160a, 160b, and the global ring 160g of FIG. 1), these components are not illustrated in FIG. 2 for purposes of illustrative clarity. For example, the system 200 comprises a plurality of processors, core interface modules, caches, memory interface modules, I/O interface modules, etc., although these components are not illustrated in FIG. 2. In the system 200 of FIG. 2, the global ring 260g is connected to four local rings 260a, . . . , 260d, by respective global interface modules 212a, . . . , 212d. Thus, as illustrated in FIGS. 1 and 2, the systems 100a and 200 are readily scalable, e.g., more local rings can be interfaced with the global ring, for example, by adding corresponding global interface modules in the global ring.

Referring again to FIG. 1, in an embodiment, various components of the system 100 can issue a transaction request. For example, ones of the processors 120a1, . . . , 120b3 of the system 100 can selectively issue one or more corresponding transaction requests. Various types of transaction requests can be issued in the system 100. For example, a read transaction request can be issued by a processor to read data from a cache or from a memory, a write transaction request can be issued by a processor to write data to a cache or to a memory, a cache transaction request can be issued by a processor to perform an operation on a cache (e.g., to evict a cache line from a cache, to update a cache line), and so on.

If a processor of the system 100 issues a transaction request, the corresponding core interface module receives the transaction request and transmits the transaction request to an appropriate destination via the corresponding ring. For example, if the processor 120a1 issues a transaction request, the corresponding core interface module 124a1 receives the transaction request and transmits the transaction request to an appropriate destination, e.g., to another core interface module or a memory interface module in the ring 160a, or in the ring 160b. In an embodiment, the core interface modules 124a1, . . . , 124a3 perform a coherency check on the transaction request issued by the processor 120a1 (as well as any other processor), and/or track coherency information of the transaction request. In an embodiment, the core interface module 124a1 becomes a local interface module on the ring 160a for a transaction request issued by the associated processor 120a1. In an embodiment, one of the core interface modules 124a1, . . . , 124a3 become a home interface module on the ring 160a for a transaction request issued by the processor 120a1 (or any other processor in the ring 160a). For example, the transaction request issued by the processor 120a1 has a source address mapped to the core interface module 124a1, thereby making the core interface module 122a1 the local interface module in the ring 160a for the transaction request. Thus, a core interface module, from which a transaction request is initialized or issued in a ring, is the local interface module for the transaction request.

A transaction request initialized in a core interface module can also be mapped to another interface module in the system 100. For example, the core interface module 122a3 can be a destination of the transaction request issued by the processor 120a1, and accordingly, the core interface module 122a3 forms a home interface module for the transaction request. For purposes of this disclosure and unless otherwise mentioned, the another interface module (e.g., the core interface module 122a3), which forms a destination for a transaction request, forms a home interface module of the transaction request. Thus, in an example, a transaction request is initiated in a local interface module, and is transmitted to a corresponding home interface module for handling and processing (e.g., to ensure coherency of the transaction and/or coherency of the caches of the system 100). In an example, for a transaction request, a corresponding home interface module and a corresponding local interface module can be the same core interface module. For example, if the processor 120a1 issues a transaction request that targets the cache 124a1 of core interface module 122a1, the core interface module 122a1 is both the home interface module and the local interface module for the transaction request.

Referring again to FIG. 1, in an embodiment, the caches 124a1, . . . , 124b3 selectively cache data from the memories 128a and 128b. Data from the memories 128a and 128b can be cached in the caches of the system 100 using static mapping or dynamic mapping. For example, as illustrated in FIG. 1, the memory 128a is coupled to the ring 160a, and the memory 128b is coupled to the ring 160b. In static mapping, data of a specific memory address of a memory (e.g., memory 128a) can be cached in specific caches, and the mapping is static in nature. For example, as will be discussed later, one or more tables (e.g., a distributed snoop filter and/or a remote line directory) identify the specific caches in which the data of the specific memory address of the memory can be cached. In an embodiment, in the static mapping, a first data stored in a first address of the memory 128a may be cached in more than one of the caches 124a1, . . . , 124b4 of the system 100, and one or more tables identify the caches in which the first data is potentially cached. In an embodiment, there exists a static map of the first address to one of the caches 124a1, . . . , 124a4 in the ring 160a, and to one of the caches 124b1, . . . , 124b4 in the ring 160b.

In dynamic mapping, data of a specific memory address of a memory (e.g., memory 128a) can also be cached in one or more of the caches 124a1, . . . , 124b4 of the system 100. However, unlike static mapping, the caches which can potentially cache the data changes (e.g., is dynamic), and the above discussed one or more tables (e.g., the distributed snoop filter and/or the remote line directory) does not necessarily identify the caches in which the data is potentially cached. Static and dynamic mapping will be discussed in more detail herein below.

Core Interface Module

FIG. 3 illustrates an example core interface module (for instance, the core interface module 122a1) of the system 100 of FIG. 1. Although only the core interface module 122a1 is illustrated in FIG. 3, various other core interface modules of the system 100 may have structure that is at least in part similar to that of FIG. 3, in an embodiment.

The example core interface module 122a1 of FIG. 3 comprises the cache 124a1, although in another embodiment, the cache 124a1 is external to the core interface module 122a1 (e.g., directly coupled to the core interface module 122a1). The core interface module 122a1 further comprises a coherency control module 310a1. In an embodiment, the coherency control module 310a1 ensures that the cache 124a1 is coherent (e.g., synchronized) with other caches and memories of the system 100.

In an embodiment, a memory address in a memory of the system 100 is mapped to one or more corresponding core interface module of the system 100. For example, each of the addresses of the memory 128a is assigned to at least one of the corresponding core interface modules 122a1, . . . , 122a4. That is, the entire span of memory addresses of the memory 128a is assigned among the core interface modules 122a1, . . . , 122a4 of the ring 160a. In an example, if a first address of a memory (e.g., the memory 128a) is mapped to a specific core interface module, the specific core interface module (e.g., the core interface module 122a1) forms a home interface module of the first memory address. Each memory address of a memory has a corresponding home interface module. If, for example, the first memory address of the memory 128a has the core interface module 122a1 as the home interface module, then the core interface module 122a1 stores various information associated with cache coherency of the first memory address of the memory 128a.

Also, a specific address of the memory 128a may be mapped to more than one core interface module. As an example, a first address of the memory 128a is mapped to core interface modules 122a1 and 122b1 in an embodiment. Thus, each of the core interface modules 122a1 and 122b1 form home interface modules for the first memory address. Furthermore, the core interface module 122a1 forms a local home interface module for the first memory address in the local ring 160a, and the core interface module 122b1 forms a local home interface module for the first memory address in the local ring 160b. As the memory 128a is coupled to the ring 160a, the core interface module 122a1 also forms a global home interface module for the first memory address of the memory 128a. For example, a local home interface module stores various information associated with cache coherency of the first memory address for the corresponding local ring, and a global home interface module stores various information associated with cache coherency of the first memory address for the entire system 100. In an example, one fourth of the addresses of the memory 128a are mapped to the core interface modules 122a1 and 122b1, one fourth of the addresses of the memory 128a are mapped to the core interface modules 122a2 and 122b2, one fourth of the addresses of the memory 128a are mapped to the core interface modules 122a2 and 122b2, remaining one fourth of the addresses of the memory 128a are mapped to the core interface modules 122a3 and 122b3.

As discussed, in an embodiment, a first data stored in one of the memories of the system (e.g., one of memories 128a and 128b) can be cached in more than one of the caches of the system 100. For example, a first data stored in a first memory address of the memory 128a can be cached in one or more of the caches 124a1, . . . , 124b4. Assume that the core interface module 122a1 is the home interface module (e.g., the global home interface module) of the first memory address of the memory 128a. In an embodiment, the core interface module 122a1 further comprises a distributed snoop filter (DSF) 314a1. In an example, the core interface module 122a1 being the home interface module of the first memory address of the memory 128a, the DSF 314a1 keeps track of all the caches in the local ring 160a that can store the first data of the first memory address of the memory 128a. For example, if the first data can be stored (or are stored) in the caches 123a1 and 123a3 of the local ring 160a, the DSF 314a1 indicates that the first data associated with the first memory address of the memory 128a can be stored by caches within the processors 120a1 and 120a3. For example, FIG. 4 illustrates an example of contents stored in an entry of an example distributed snoop filter (e.g., an entry in the DSF 314a1 of FIG. 3). The entry in the DSF 314a1 in FIG. 4 indicates that the first data associated with the first memory address of the memory 128a can be stored by caches included in the processors 120a1 and 120a3 (i.e., can be stored in the caches 123a1 and 123a3). This indicates that the first data of the first address of the memory 128a are held by the processors 120a1 and 120a3. Put differently, if a DSF is included in a first core interface module, then the DSF entry indicates, for a memory address for which the first core interface module is the home interface module, one or more processors, where one or more caches included in the one or more processors can cache the first data.

In an embodiment, for a specific memory address of a memory that is coupled to a first local ring, the corresponding DSF only indicates the processors of the first local ring that can hold the data of the specific memory address. For example, referring to FIG. 4, even if the first data of the first address of the memory 128a can be cached by caches of the processors 120a1, 120a3 and 120b2, the entry of the DSF 314a1 only indicates processors 120a1 and 120a3 (as only these two processors are associated with the local ring 160a). That is, in this example, the entry of the DSF 314a1 does not indicate that the cache associated with the processor 120b2 can store the first data of the first address of the memory 128a.

Referring again to FIG. 3, in an embodiment, the core interface module 122a1 further comprises a remote line directory (RLD) 318a1. In an example, the core interface module 122a1 being the home interface module (e.g., the global home interface module) of a first memory address of the memory 128a, the RLD 318a1 keeps track of all the remote clusters in the system 100 that store the first data of the first memory address of the memory 128a, in an embodiment. For example, assume the first data can be stored (or are stored) in the caches 120a1 and 120a3 of the local ring 160a, and in the cache 124b2 of the local ring 160b. Then, the RLD 318a1 indicates that the first data associated with the first memory address of the memory 128a can be stored in a cluster associated with the local ring 160b. That is, the RLD 318a1 identifies one or more remote clusters (i.e., one or more clusters that are remote to, or different from the cluster associated with the local ring 160a) that can cache the first data associated with the first memory address of the memory 128a. FIG. 5 illustrates an example remote line directory (e.g., the RLD 318a1 of FIG. 3). The RLD 318a1 in FIG. 5 indicates that the first data associated with the first memory address of the memory 128a can be stored in a cluster 2 (e.g., which is associated with the local ring 160b). Thus, the RLD 318a1 in FIG. 5 identifies all the remote clusters (and the associated remote local rings) in which the first data associated with the first memory address of the memory 128a can be stored. It is noted that although the cluster associated with the local ring 160a can cache the first data associated with the first memory address of the memory 128a, the RLD 318a1 does not identify the cluster associated with the local ring 160a—rather, the RLD 318a1 only identifies remote clusters (that is, clusters that are remote to, or different from the cluster associated with the local ring 160a) that can cache the first data associated with the first memory address of the memory 128a.

A first cluster associated with the local ring 160a is a home cluster for the first memory address of the memory 128a (e.g., as the memory 128a is included in the first cluster). A second cluster associated with the local ring 160b is a remote cluster for the first memory address of the memory 128a. The RLD 318a1 selectively identifies one or more remote clusters for caching the first data stored in the first memory address of the memory 128a, in an embodiment.

Cache Architecture

As previously discussed, the cache architecture of the system 100 comprises a multi-bank cache (e.g., a plurality of cache slices, including caches 124a1, ..., 124b4), in which each cache can be accessed by more than one processor. In the system 100, the access time to different caches differs and depends on a requesting processor (i.e., the processor that requests the cache access). For example, a time taken for the processor 120a1 to access the cache 124a1 is relatively less compared to a time taken for the processor 120a1 to access the cache 124a2. Similarly, the time taken for the processor 120a1 to access the cache 124a2 is relatively less compared to a time taken for the processor 120a1 to access the cache 124b4. The cache architecture of the system 100 is also referred to herein as Non Unified Cache Architecture (NUCA), for example, as the time taken takes by ones of the processors to access ones of the caches is non-uniform.

In an embodiment, the cache architecture of the system 100 can operate in one of a plurality of modes. For example, the cache architecture of the system 100 can operate in one of a static mapped cache architecture mode and a dynamic mapped cache architecture mode.

In the static mapped cache architecture mode, a specific memory address of, for example, the memory 128a is statically mapped to one of the caches in ring 160a and to one of the caches in ring 160b. Furthermore, in the static mapped cache architecture mode, the mapping of the specific memory address of the memory 128a to the cache is in accordance with the corresponding DSF and RLD residing in the home interface module (e.g., the global home interface module) of the specific memory address. For example, in the static mapped cache architecture mode, if the core interface module 122a1 is the home interface module of the specific memory address of the memory 128a, then the DSF and RLD residing in the core interface module 122a1 identifies the specific caches in which the data of the specific memory address can be cached. If a cache (e.g., the cache 123a1) can cache the data of the specific memory address of the memory 128a, then the corresponding processor (e.g., the processor 120a1) is said to hold the data of the specific memory address of the memory 128a.

In the dynamic mapped cache architecture mode, a specific memory address of, for example, the memory 128a is allocated dynamically to any cache of the system 100 for caching, in an embodiment. Thus, in the dynamic mapped cache architecture mode, data of the specific memory address of the memory 128a can be dynamically allocated and cached in any cache of the system 100 (e.g., to any cache in the local ring 160a and/or the local ring 160b). In an embodiment, in the dynamic mapped cache architecture mode, the caching of the data of the specific memory address of the memory 128a by one or more caches of the system 100 may not be in accordance with the DSF and RLD residing in the home interface module (e.g., the global home interface module) of the specific memory address.

The following sections discuss operations of the system 100 in the static mapped cache architecture mode and the dynamic mapped cache architecture mode in more details.

Static Mapped Cache Architecture Mode

Figure 6A:
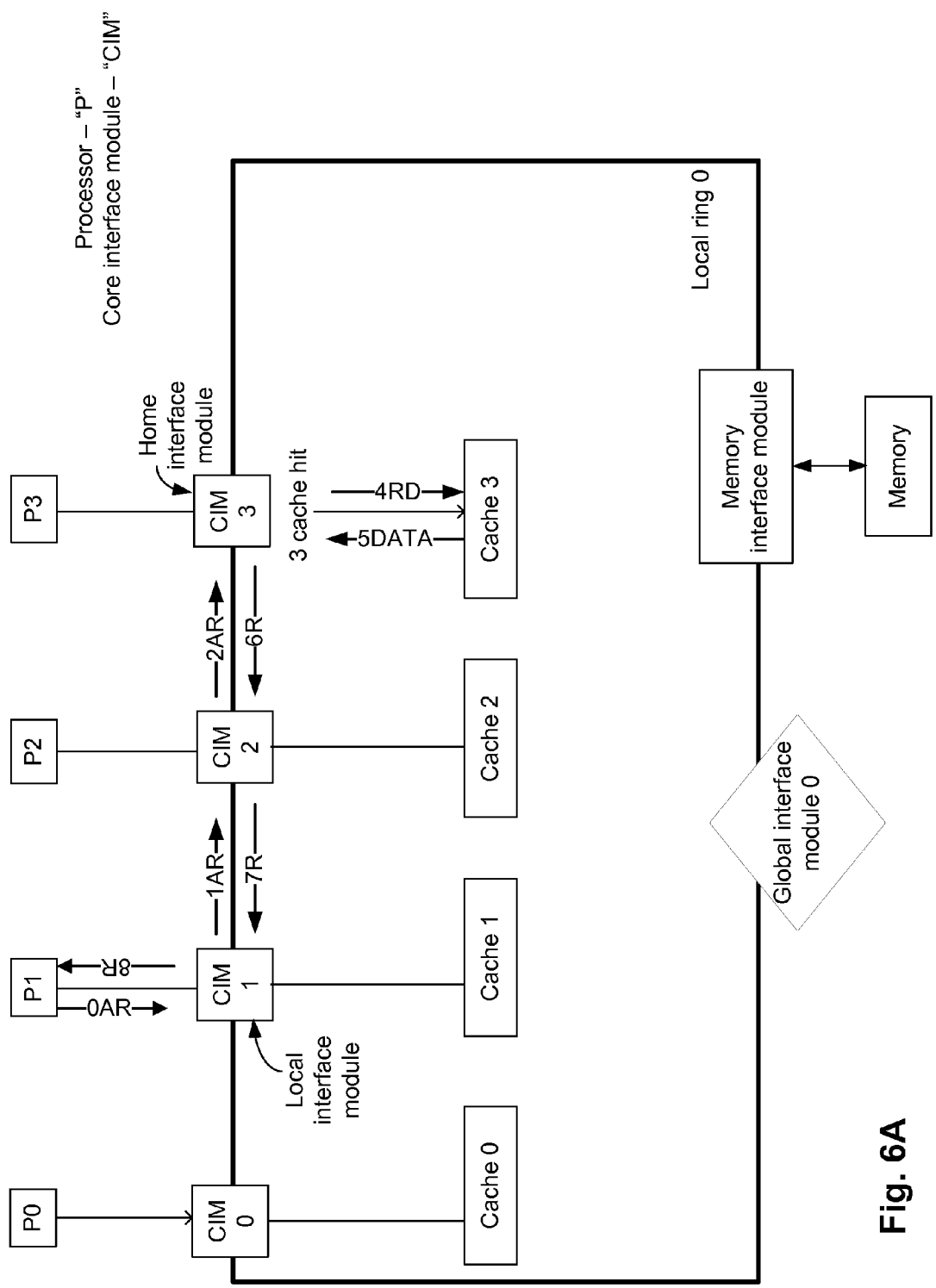
FIGS. 6A-6D illustrate example read operations while a multi-core processing system operates in a static mapped cache architecture mode.

FIG. 6A illustrates an example read operation while a multi-core processing system (e.g., the system 100 of FIG. 1) operates in a static mapped cache architecture mode. FIG. 6A is a simplified version of FIG. 1. For example, in FIG. 6A, only one local ring 0 (e.g., which may be any one of the rings 160a and 160b) is illustrated. Furthermore, for purposes of simplicity, in FIG. 6A, the processors of the local ring 0 are labeled as P0, ..., P3, and the respective core interface modules are labeled as CIM 0, ..., CIM 3.

Furthermore, each of the core interface modules CIM 0, . . . , 3 is associated with a corresponding one of the caches 0, . . . , 3, as illustrated in FIG. 6A. In FIG. 6A, each cache is illustrated to be external to the corresponding core interface module, although in another embodiment (e.g., as illustrated in FIG. 1), the cache can be included in the corresponding core interface module. FIG. 6A also illustrates various transaction requests transmitted between various components of the local ring 0.

In FIG. 6A and various subsequent figures (e.g., FIGS. 6B-7D), issuance, processing and/or transmission of a transaction request (or data) is identified by a number and a type of the transaction request. For example, each action in these figures is labeled using a corresponding number and one or more corresponding alphabets indicating a type of the action. For example, FIG. 6A illustrates 0AR, 1AR, etc. The numbers indicate a sequence in which the associated action occurs. For example, the action associated with the number "1" occurs subsequent to the action associated with the number "0". If two actions have the same number, the two actions can at least in part occur simultaneously.

In the example of FIG. 6A, the processor P1 initiates a transaction request, which may be an address request to read data cached in a cache of the local ring 0. For example, initially, the processor P1 issues an address request (labeled as 0AR in FIG. 6A) to the corresponding CIM 1. Thus, the CIM 1 is the local interface module of the transaction request. In the example of FIG. 6A, assume that the CIM 3 is the home interface module (i.e., the CIM 3 is the destination of the address request, and is to process the address request). The address request issued by the processor P1 has an address of the home interface module (i.e., identifies the CIM 3 as the home interface module). In a static mapped cache architecture mode, this implies that the cache 3 associated with the CIM 3 can cache the data that the processor P1 wants to access. Accordingly, the CIM 1 forwards the address request to the CIM 2 (e.g., illustrated as 1AR in FIG. 6A); and subsequently, the CIM 2 forwards the address request to the CIM 3 (e.g., illustrated as 2AR in FIG. 6A). Once the CIM 3 receives the address request, the CIM 3 determines that the address request results in a cache hit (e.g., illustrated as 3 cache hit in FIG. 6A). That is, the requested data is cached in the cache 3. The CIM 3 access and reads the data from the cache 3 (e.g., illustrated as 4RD in FIG. 6A), and the cache 3 outputs the data (e.g., illustrated as 5DATA in FIG. 6A) to the CIM 3. The CIM 3 receives the data read from the cache 3, and transmits the data to the processor P1 (i.e., to the initiator of the request), via CIM 2 and CIM 1 (e.g., illustrated as 6R, 7R and 8R in FIG. 6A).

Figure 6B:
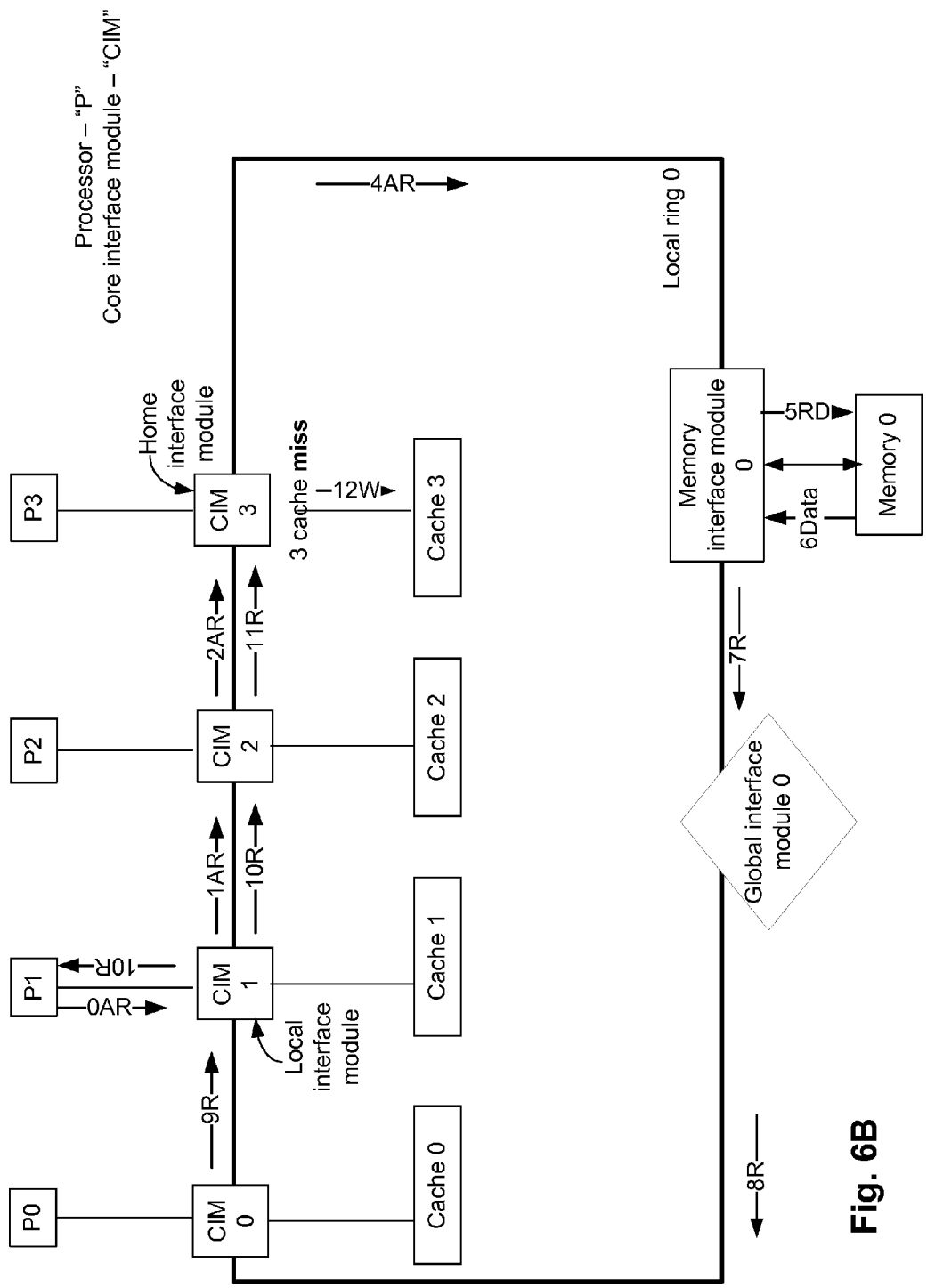

In FIG. 6A, the read request was a hit at the cache 3 of the home interface module. However, in another example, the read request may not result in a cache hit in the cache of the home interface module. FIG. 6B illustrates another example read operation while a multi-core processing system (e.g., the system 100 of FIG. 1) operates in the static mapped cache architecture mode. In FIG. 6B, the read request results in a cache miss in the cache of the home interface module. Similar to FIG. 6A, in the example of FIG. 6B, the processor P1 initiates an address request (labeled as 0AR in FIG. 6B) to, for example, read data. The data to be read is stored in a specific address of the memory 0, which has the CIM 3 as the home interface module. Accordingly, the CIM 1 is the local interface module of the address request and the CIM 3 is the home interface module (i.e., the CIM 3 is the destination of the address request, and is to process the address request). The address request issued by the processor P1 reaches the CIM 3, via CIM 1 and CIM 2 (e.g., illustrated as 1AR and 2 AR in FIG. 6B). Once the CIM 3 receives the address request, the CIM 3 determines a cache miss (e.g., illustrated as 3 cache miss in FIG. 6B). That is, the cache 3 does not have a valid copy of the requested data.

In response to the cache miss in the cache 3, the CIM 3 then forwards the address request by the to the memory interface module 0 (e.g., illustrated as 4AR in FIG. 6B). The memory interface module 0 reads the data from the memory 0 (e.g., illustrated as 5RD in FIG. 6B), and transmits the data read from the memory 0 to the processor P1, via the global interface module 0, the CIM 0 and the CIM 1 (e.g., illustrated as 7R, 8R, 9R and 10R in FIG. 6B). The CIM 1 also transmits the data read from the memory 0 to the CIM 3 (e.g., illustrated as 10R and 11R in FIG. 6B). Once the CIM 3 receives the data, the CIM 3 writes the data to the cache 3 (e.g., illustrated as 12W in FIG. 6B). Thus, in FIG. 3, in response to the cache miss in the cache 3 associated with the home interface module, the requested data is directly fetched from the memory 0.

In FIGS. 6A and 6B, the local interface module and the home interface module were in the same local ring. That is, the processor P1 of the local ring 0 attempted to read data cached in the cache 3 of the local ring 0.

Figure 6C:
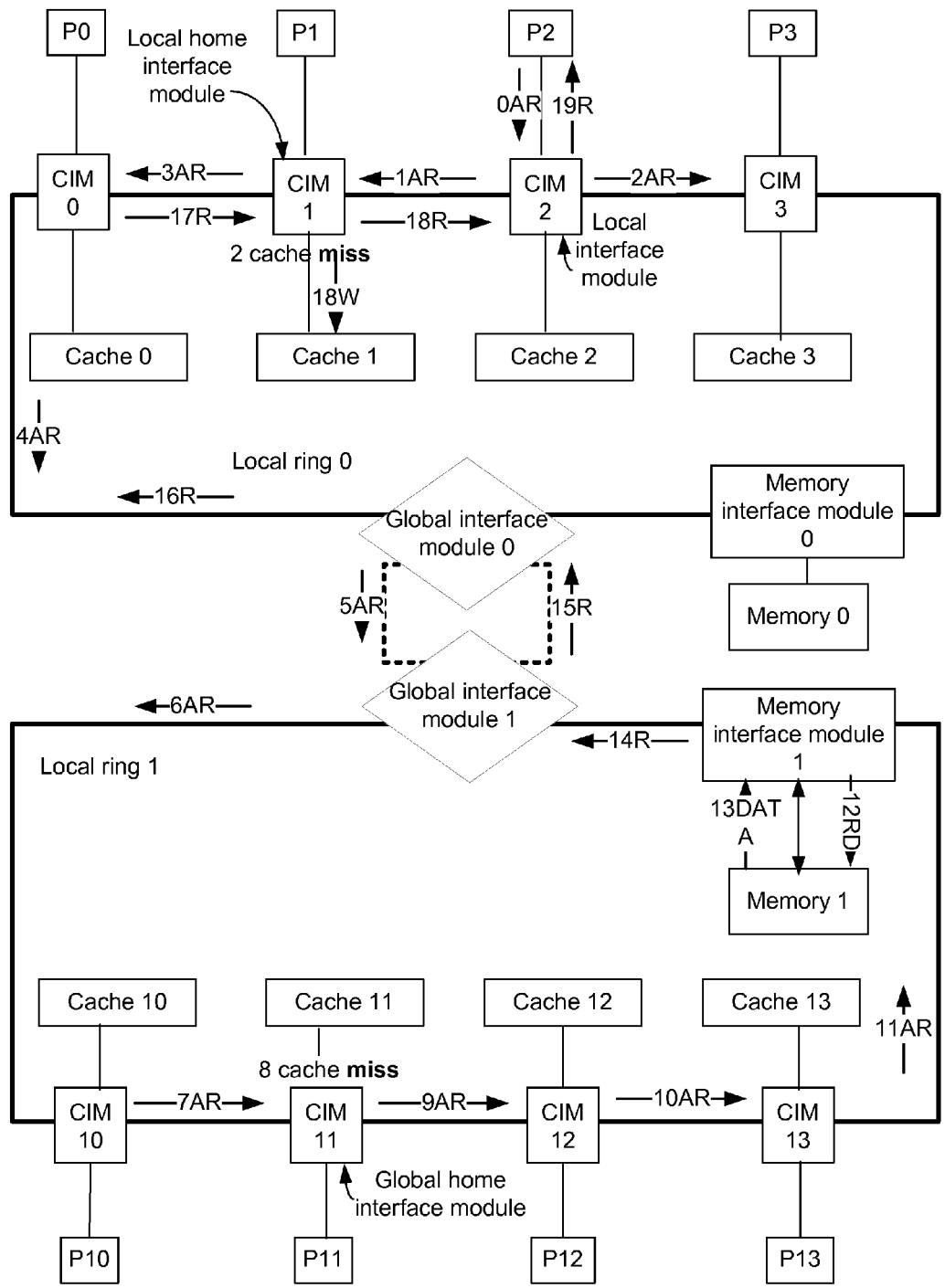

FIG. 6C illustrates another example read operation while a multi-core processing system (e.g., the system 100 of FIG. 1) operates in the static mapped cache architecture mode. In the example of FIG. 6C, a processor of a local ring 0 reads data from a different local ring (e.g., a local ring 1). Similar to FIG. 6A, the system in FIG. 6C has the local ring 0, associated processors P0, . . . , P3, associated CIMs 0, . . . , 3, associated caches 0, . . . , 3, and memory interface module 0.

In addition, FIG. 6C illustrates a second local ring 1 comprising processors P10, . . . , P13, CIMs 10, . . . , 13, caches 10, . . . , 13, a memory interface module 1, and a memory 1 coupled to the memory interface module 1. A global ring (e.g., illustrated using dotted lines in FIG. 6C), comprising global interface modules 0 and 1, interconnects the two local rings 0 and 1.

In FIG. 6C, the processor P2 issues a transaction request to read data that is stored in a specific memory address of the memory 1. That is, the processor P2, which is in local ring 0, attempts to read data stored in the specific memory address of the memory 1 that is coupled to the local ring 1. The CIM 2 is the local interface module, as the transaction is issued in the processor P2.

Also assume that the data in the specific memory address of the memory 1 can be cached by the caches 1 and 11. Thus, the cache 1 is the local home interface module for the specific memory address of the memory 0 in the ring 0, and the cache 11 is the local home interface module for the specific memory address of the memory 1 in the ring 1. Furthermore, as the memory 1 is coupled to the local ring 1, the cache 11 is also the global home interface module for the specific memory address of the memory 1. For example, a DSF maintained by the global home interface module (i.e., the CIM 11) identifies that the cache 11 can potentially cache the data of the specific memory address of the memory 1. Furthermore, an RLD maintained by the global home interface module (i.e., the CIM 11) identifies that the data of the specific memory address of the memory 1 is potentially cached in caches of both the local rings 0 and 1.

Referring again to FIG. 6C, when the processor P2 issues the address request to the CIM 2 (e.g., illustrated as 0AR), the cache 1 associated with the CIM 1 (i.e., the local home interface module) is checked first to determine if the requested data is stored in the cache 1. As illustrated in FIG.

6C, it is determined that the requested data is a miss in the cache 1 (e.g., illustrated as 2 cache miss in FIG. 6C). As the requested data is not stored in cache 1 of the local home interface module CIM 1 of the local ring 0, the cache 11 of the CIM 11 (i.e., the global home interface module) is then checked to determine if the requested data is cached therein. For example, the transaction request is transmitted from the CIM 1 to the CIM 11 via the CIM 0, the global interface module 0, the global interface module 1, and the CIM 10 (e.g., illustrated as 3AR, . . . , 7AR in FIG. 6C).

In the example of FIG. 6C, the transaction request also results in a cache miss in cache 11 of the global home interface module CIM 11. Accordingly, the transaction request is transmitted to the memory interface module 1, e.g., to fetch the requested data from the memory 1 (e.g., illustrated as 9AR, . . . , 12RD in FIG. 6C). Once the data is read by the memory interface module 1 from the memory 1, the requested data is transmitted to the processor P2 via the global interface modules 1 and 0, and the CIMs 0, 1 and 2 (e.g., illustrated as 14R, . . . , 19R in FIG. 6C). In an embodiment, the data read from the memory 1 may also be transmitted to one or both of the caches 1 and 11 (i.e., to the caches associated with the local and global home interface module), for caching the data (e.g., caching of the data in the cache 1 is illustrated as 18W in FIG. 6C).

It is noted that in FIG. 6C, 18W indicates transmitting the data from the CIM 1 to the cache 1, and 18R indicates transmitting the data from the CIM 1 to the CIM 2. Both these actions having the same numerical "18" indicates that these two actions can be performed at least in part simultaneously.

Figure 6D:
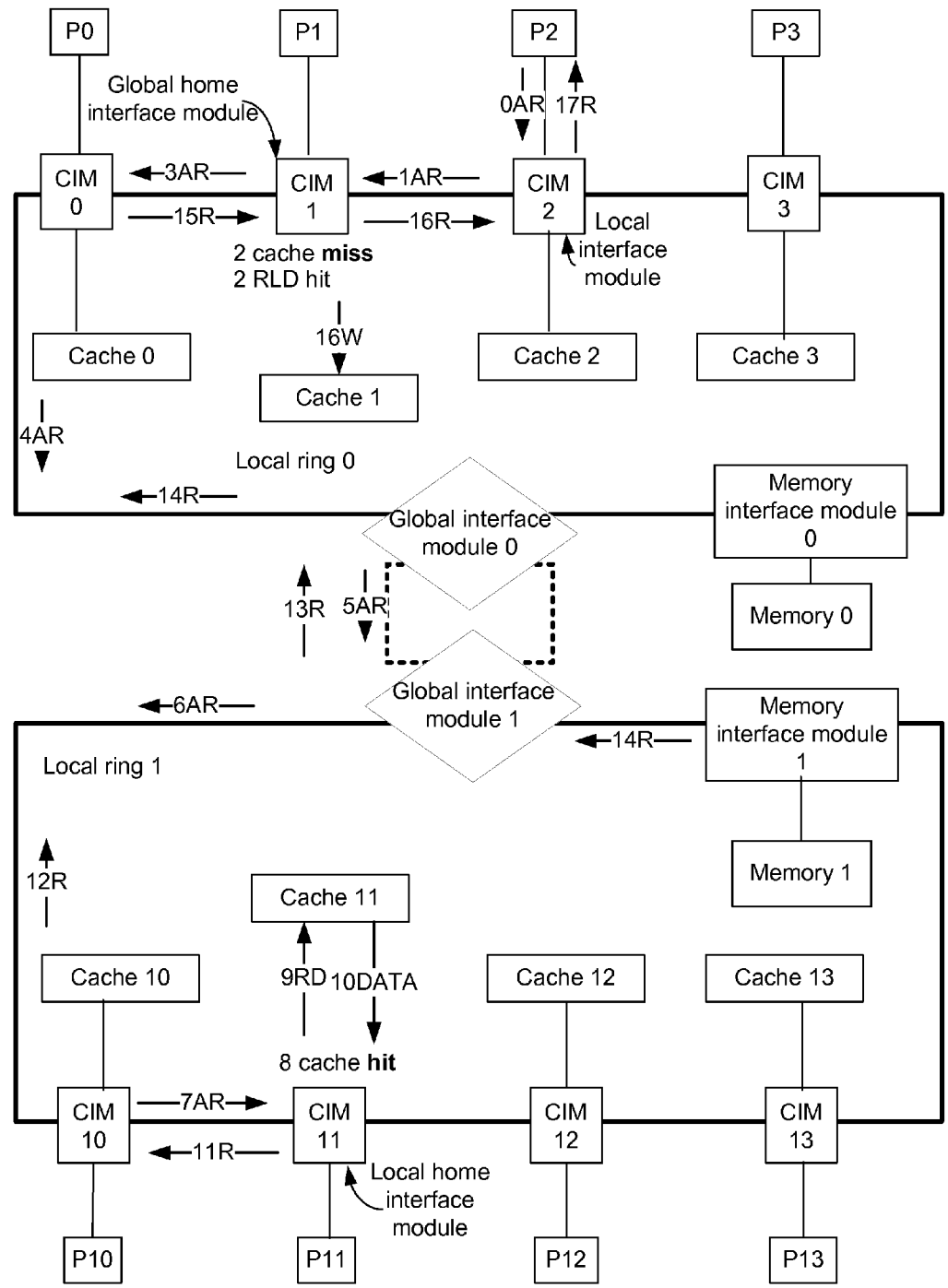

FIG. 6D illustrates another example read operation while a multi-core processing system (e.g., the system 100 of FIG. 1) operates in the static mapped cache architecture mode. The system architecture of FIG. 6D is similar to that of FIG. 6C. For example, both FIGS. 6C and 6D illustrate the two local rings 0 and 1, various components associated with the local ring, and the global ring connecting the two local rings.

In FIG. 6D, the processor P2 issues a transaction request to read data that is stored in a specific memory address of the memory 0. That is, the processor P2, which is in local ring 0, attempts to read data stored in the specific memory address of the memory 0 that is also coupled to the local ring 0. The CIM 2 is the local interface module, as the transaction is issued in the processor P2.

In the example of FIG. 6D, assume that the data in the specific memory address of the memory 0 can be cached by the caches 1 and 11. Thus, the CIM 1 is the local home interface module in the local ring 0 for the specific memory address of the memory 0, and the CIM 11 is the local home interface module in the local ring 1 for the specific memory address of the memory 0. Furthermore, as the memory 0 is coupled to the local ring 0, the CIM 1 is also the global home interface module for the specific memory address of the memory 0. An RLD maintained by the global home interface module (i.e., the CIM 1) identifies that the data of the specific memory address of the memory 0 is potentially cached in caches of the local ring 1.

In FIG. 6D, when the processor P2 issues the address request to the CIM 2 (e.g., illustrated as 0AR), the cache 1 associated with the CIM 1 (i.e., the global home interface module) is checked first to determine if the requested data is stored in the cache 1. As illustrated in FIG. 6D, it is determined that the requested data is a miss in the cache 1 (e.g., illustrated as 2 cache miss in FIG. 6D). As the requested data is not stored in cache 1 of the global home interface module CIM 1 of the local ring 0, the RLD included in the CIM 1 is looked up to check if the requested data is cached in a cache of a remote local ring. In the example of FIG. 6D, the RLD of CIM1 returns a HIT (illustrated as 2RLD hit in FIG. 6D) and points to the local ring 1. Accordingly, the cache 11 of the CIM 11 (i.e., the local home interface module in the local ring 1) is then checked to determine if the requested data is cached therein. For example, the transaction request is transmitted from the CIM 1 to the CIM 11 via the CIM 0, the global interface modules 0 and 1, and the CIM 10 (e.g., illustrated as 3AR, . . . , 7AR in FIG. 6D). In the example of FIG. 6D, the transaction request results in a cache hit in cache 11 of the local home interface module CIM 11 of the local ring 1 (e.g., illustrated as 8 cache hit in FIG. 6D). The requested data is read by the CIM 11 from the cache 11 (e.g., illustrated as 9RD and 10DATA in FIG. 6D). Subsequently, the data read from the cache 11 is transmitted from the CIM 11 to the processor P2, as illustrated in FIG. 6D (e.g., illustrated as 11R, . . . , 17R in FIG. 6D). Also, when the CIM 1 receives the data read from the cache 11, in an embodiment, the CIM 1 may also store the data in the cache 1 (e.g., illustrated as 16W in FIG. 6D). It is to be noted that in FIG. 6D, 16W indicates transmitting the data from the CIM 1 to the cache 1, and 16R indicates transmitting the data from the CIM 1 to the CIM 2. Both these actions having the same numerical "16" indicates that these two actions are performed at least in part simultaneously, in an embodiment.

Figure 6E:
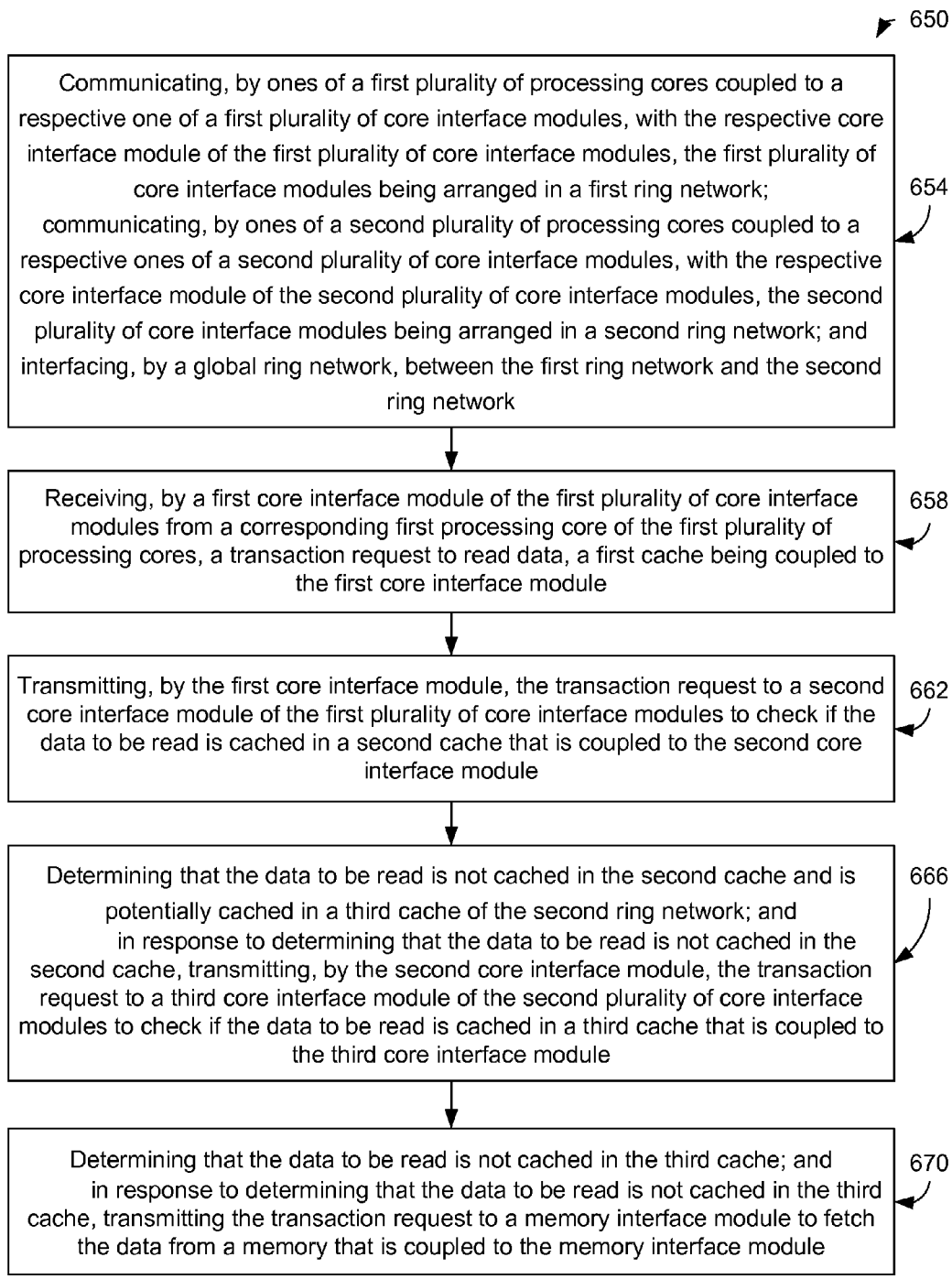
FIG. 6E is a flow diagram illustrating an example method for a read operation while a multi-core processing system operates in the static mapped cache architecture mode.

FIG. 6E is a flow diagram illustrating an example method 650 for a read operation while a multi-core processing system (e.g., the systems illustrated in FIGS. 6A-6D) operates in the static mapped cache architecture mode. Referring to FIGS. 6A-6E, at 654, ones of a first plurality of processing cores (e.g., processors P0, . . . , P3) coupled to a respective one of a first plurality of core interface modules (e.g., CIMs 0, . . . , 3) communicates with the respective core interface module of the first plurality of core interface modules, the first plurality of core interface modules being arranged in a first ring network (e.g., local ring 0); ones of a second plurality of processing cores (e.g., processors P10, . . . , P13) coupled to a respective ones of a second plurality of core interface modules (e.g., CIMs 10, . . . , 13) communicates with the respective core interface module of the second plurality of core interface modules, the second plurality of core interface modules being arranged in a second ring network (e.g., local ring 1); and a global ring network interfaces between the first ring network and the second ring network.

At 658, a first core interface module (e.g., CIM 2 of FIG. 6C) of the first plurality of core interface modules receives from a corresponding first processing core (e.g., processor P2) of the first plurality of processing cores receives a transaction request to read data, a first cache (e.g., cache 2) being coupled to the first core interface module.

At 662, the first core interface module transmits the transaction request to a second core interface module (e.g., CIM 1, which is the local home interface module in the first ring network) of the first plurality of core interface modules to check if the data to be read is cached in a second cache (e.g., cache 1) that is coupled to the second core interface module.

At 666, it is determined that the data to be read is not cached in the second cache (e.g., illustrated as 2 cache miss in FIG. 6C), and is potentially cached in a third cache of the second ring network (e.g., based on an RLD hit); and in response to determining that the data to be read is not cached in the second cache (and is potentially cached in a third cache of the second ring network), the second core interface module transmits the transaction request to a third core interface module (e.g., CIM 11 of FIG. 6C, which is the local home interface module in the second ring network) of the second plurality of core interface modules to check if the data to be read is cached in the third cache (e.g., cache 11) that is coupled to the third core interface module.

At 670, its is determined that the data to be read is not cached in the third cache (e.g., illustrated as 8 cache miss in FIG. 6C); and in response to determining that the data to be read is not cached in the third cache, the transaction request is transmitted to a memory interface module (e.g., memory interface module 1) to fetch the data from a memory (e.g., memory 1) that is coupled to the memory interface module.

Dynamic Mapped Cache Architecture Mode

As previously discussed, in the static mapped cache architecture mode, for a specific memory address of, for example, the memory 128a of system 100, a corresponding DSF keeps track of the caches included in the corresponding processors (e.g., caches 123a1, . . . , 123a4 of FIG. 1); and a corresponding RLD keeps track of the caches included in one or more remote rings (e.g., RLDs of CIM0, . . . , CIM3 keeps track of caches in the CIMs of the local ring 1, i.e., CIM10, . . . , CIM13). Accordingly, in the static mapped cache architecture mode, as discussed with respect to FIGS. 6A-6D, caches associated with the home interference modules (e.g., one or more local and global home interference modules), or any other cache as indicated in the corresponding DSF and/or the RLD, are checked to determine if a data requested by a processor is cached. That is, in the static mapped cache architecture mode, a transaction checks a pre-determined number of caches (e.g., based on the corresponding DSF and/or the RLD) to determine if the data requested is cached in any of these caches. If the data requested by is not cached in any of these caches, the data is fetched from the memory, in an embodiment.

In contrast, in the dynamic mapped cache architecture mode, for a specific memory address of, for example, the memory 128a of system 100, the caches attached to the CIM (e.g., caches 124a1, . . . , 124b3 in FIG. 1) can hold data that is not tracked by the corresponding DSF and RLD of same node. For example, in the dynamic mapped cache architecture mode, one or more caches dynamically caches the data of the specific memory address of the memory 128a, while the RLD and DSF tracking the same data can be in a different CIM. To locate a cached data, in the dynamic mapped cache architecture mode, when a processor requests data of a specific memory address of, for example, the memory 128a, the caches associated with the local interface module and the home interface modules are checked first. If the requested data is not stored in these caches, any other number of caches in the system can also be checked to determine if any of these other caches have cached the requested data. The dynamic mapped cache architecture mode is discussed in detail herein below.

Figure 7A:
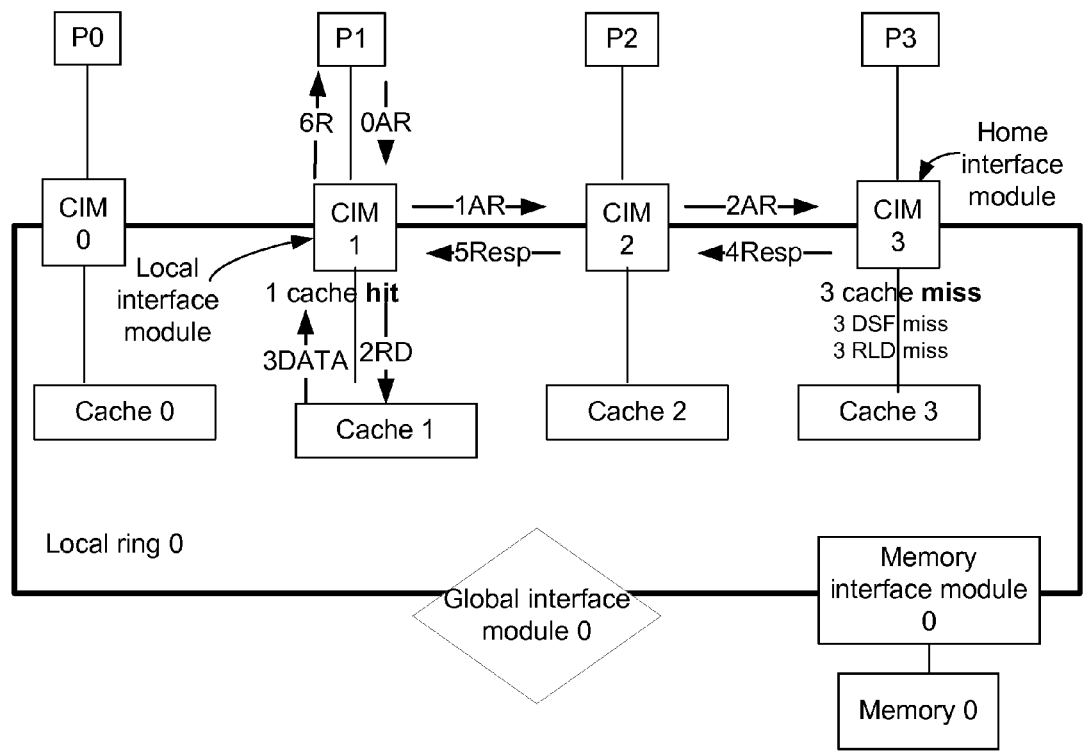
FIGS. 7A-7D illustrate example read operations while a multi-core processing system operates in a dynamic mapped cache architecture mode.

FIG. 7A illustrates an example read operation while a multi-core processing system (e.g., the system 100 of FIG. 1) operates in a dynamic mapped cache architecture mode. The architecture presented in FIG. 7A is similar to FIG. 6A. For example, FIG. 7A illustrates only one local ring 0 (e.g., any one of the rings 160a and 160b) comprising processors P0, . . . , P3, core interface modules CIM 0, . . . , CIM 3, caches 0, . . . , 3, the memory interface module 0, and the memory 0.

In the example of FIG. 7A, the processor P1 initiates an address request to, for example, read data of a specific memory address of the memory 0, which may be cached in one of the caches of the local ring 0. For example, initially, the processor P1 issues an address request (labeled as 0AR in FIG. 7A) to the corresponding CIM 1. Thus, the CIM 1 is the local interface module of the transaction request. In the example of FIG. 7A, assume that the CIM 3 is the home interface module of the transaction request (i.e., i.e. the DSF and RLD that track the address of the transaction are in CIM3).

In dynamic mapped cache architecture mode, the data requested by the processor P1 may, with relatively high probability, be cached in the caches associated with the local interface module and/or the home interface module. For example, in an embodiment, a heuristic algorithm attempts to ensure that the data, which is to be likely requested by a processor, is cached in the cache coupled to the processor or in a cache of the associated home interface module. The heuristic algorithm, for example, is based on past data requested by the processor, a prior knowledge about which application runs on which processor (and which processor may request data), and/or the like. For example, the data requested by the processor P1 may, with relatively high probability, be cached in the cache 1; and when a data is found to be shared by multiple processors, the data may be cached with relatively high priority in the cache of the home interface module (e.g., cache 3 of the CIM 3). For example, the data requested by the processor P1 may, with relatively high probability, be cached in the caches 1 and 3. Accordingly, the cache 1 (associated with the local CIM 1) and cache 3 (associated with the home interface module CIM 3) are checked first to determine if the data requested by the processor P1 is cached in one of the caches 1 and 3.

Accordingly, once the CIM 1 receives the address request, the CIM 1 determines whether the address request is a cache hit or a cache miss in the cache 1. In the example of FIG. 7A, the address request results in a cache hit in the cache 1 (e.g., illustrated as 1 cache hit in FIG. 7A). While the CIM 1 determines whether the address request is a cache hit or a cache miss in the cache 1, the CIM 1 also at least partially simultaneously transmits the address request to the home interface module CIM 3 (e.g., illustrated as 1AR and 2AR in FIG. 7A). Thus, in FIG. 7A, the CIM 1 transmits the address request to the CIM 3 irrespective of whether the address request results in a cache hit or a cache miss in the cache 1. For example, the CIM 1 transmits the address request to the CIM 3, while the CIM 1 checks to determine if the address request results in a cache hit in the cache 1.

Also, the address request results in a cache miss, an RLD miss and a DSF miss in CIM 3 (e.g., illustrated as 3 cache miss, 3 DSF miss, 3 RLD miss in FIG. 7A). The CIM 3 transmits a response to the CIM 1 (e.g., illustrated as 4Resp and 5Resp in FIG. 7A), indicating that the address request resulted in a cache miss in the cache 3. As the address request results in a cache hit in the cache 1, the CIM 1 reads the requested data from the cache 1 (e.g., illustrated as 2RD and 3DATA in FIG. 7A). Prior to, subsequent to or while the CIM 1 receives the response from the CIM 3 indicating the cache miss in the cache 3, the CIM 1 transmits the requested data, read from the cache 1, to the processor P1. In the example of FIG. 7, subsequent to the CIM 1 receiving the response from the CIM 3 indicating the cache miss in the cache 3, the CIM 1 transmits the requested data, read from the cache 1, to the processor P1 (e.g., illustrated as 6R in FIG. 7A).

Figure 7B:
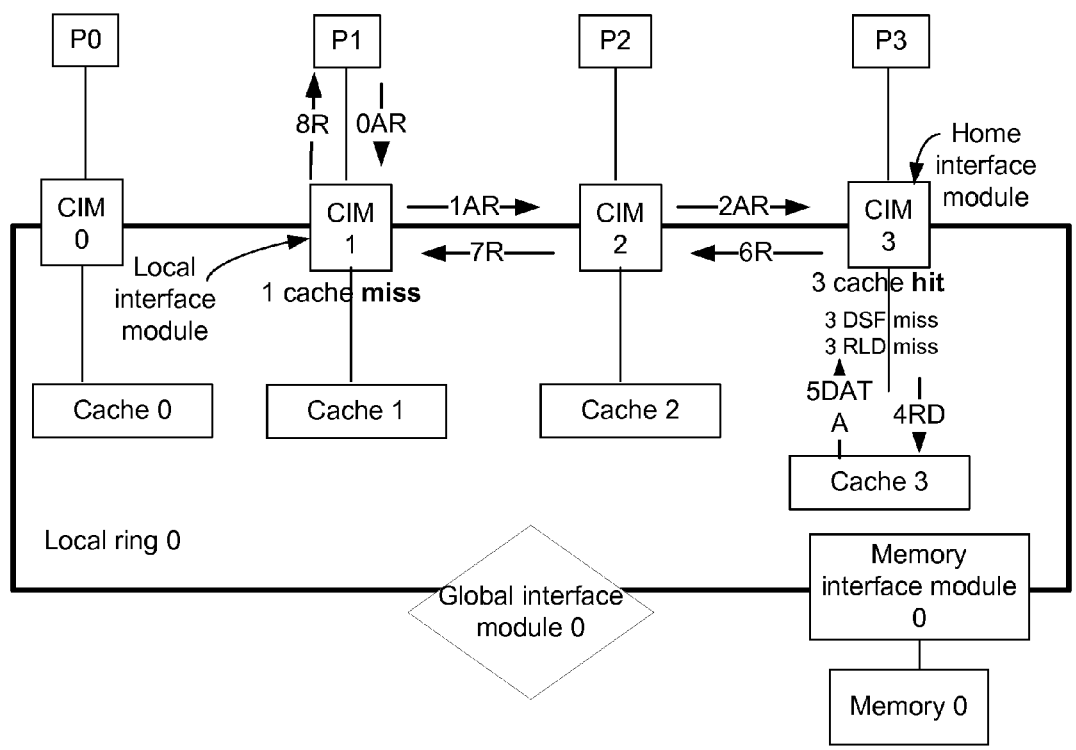

FIG. 7B illustrates another example read operation while a multi-core processing system (e.g., the system 100 of FIG. 1) operates in the dynamic mapped cache architecture mode.

In FIG. 7A, the address request resulted in a cache hit in the cache of the local interface module, while resulting in a cache miss in the home interface module. In contrast, in FIG. 7B, the address request results in a cache miss in the cache of the local interface module, while resulting in a cache hit in the home interface module.

Similar to FIG. 7A, in the example of FIG. 7B, the processor P1 initiates an address request to, for example, read data of a specific memory address of the memory 0. Also, similar to FIG. 7A, in the example of FIG. 7B, the CIM 1 is the local interface module and the CIM 3 is the home interface module.

In FIG. 7B, initially, the processor P1 issues an address request (labeled as 0AR in FIG. 7A) to the corresponding CIM 1. Once the CIM 1 receives the address request, the CIM 1 determines whether the address request is a cache hit or a cache miss in the cache 1. In the example of FIG. 7B, the address request results in a cache miss in the cache 1 (e.g., illustrated as 1 cache miss in FIG. 7B). While the CIM 1 determines whether the address request is a cache hit or a cache miss in the cache 1, the CIM 1 also transmits the address request to the home interface module CIM 3 (e.g., illustrated as 1AR and 2AR in FIG. 7B). Thus, in FIG. 7B, the CIM 1 transmits the address request to the CIM 3 irrespective of whether the address request results in a cache hit or a cache miss in the cache 1.

In the example of FIG. 7B, the address request results in a cache hit in the cache 3 (e.g., illustrated as 3 cache hit in FIG. 7B). The CIM 3 reads the requested data from the cache 3 (e.g., illustrated as 4RD and 5DATA in FIG. 7B), and transmits the data read from the cache 3 to the processor P1 via the CIM 2 and the CIM 1 (e.g., illustrated as 6R, 7R and 8R in FIG. 7B).

Figure 7C:
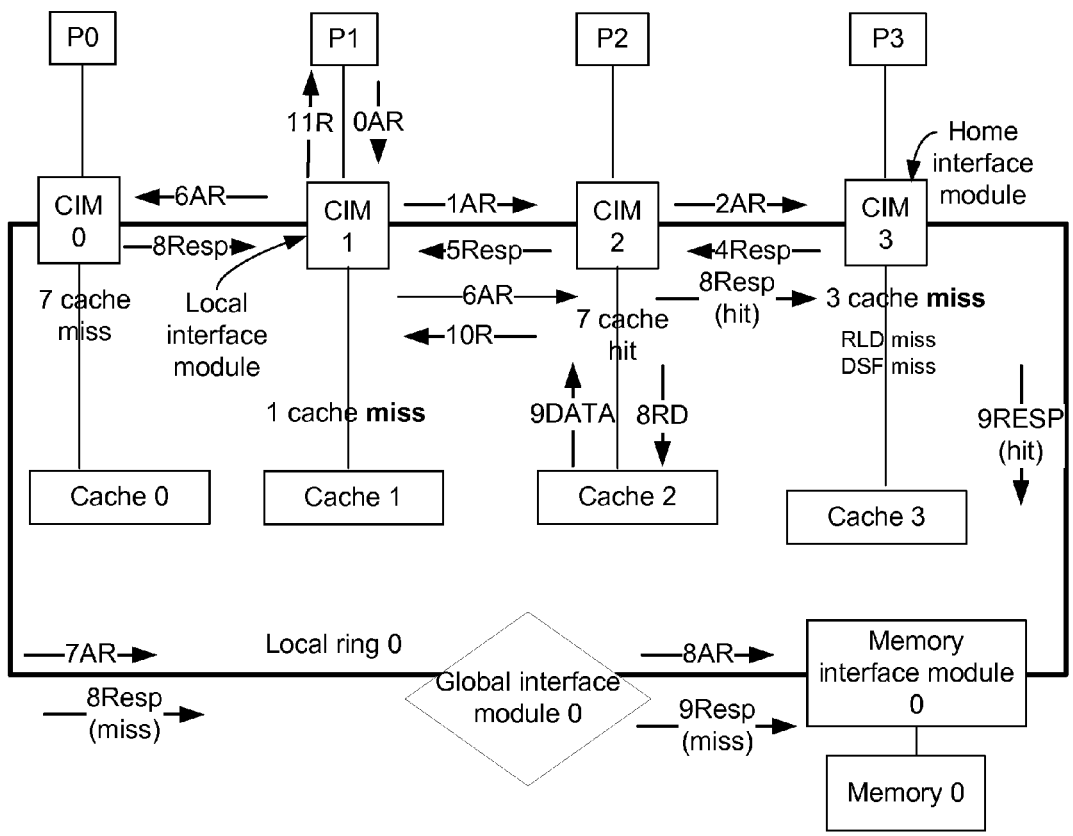

FIG. 7C illustrates another example read operation while a multi-core processing system (e.g., the system 100 of FIG. 1) operates in the dynamic mapped cache architecture mode. As discussed, in FIG. 7A, the address request resulted in a cache hit in the cache of the local interface module, while resulting in a cache miss in the home interface module. Also, in FIG. 7B, the address request resulted in a cache miss in the cache of the local interface module, while resulting in a cache hit in the home interface module. In contrast, in FIG. 7C, the address request results in a cache miss in the caches of both the local interface module and the home interface module, as a result of which other caches of the local ring 0 are checked.

Similar to FIGS. 7A and 7B, in the example of FIG. 7C, the processor P1 initiates an address request to, for example, read data of a specific memory address of the memory 0. Also, similar to FIGS. 7A and 7B, in the example of FIG. 7C, the CIM 1 is the local interface module and the CIM 3 is the home interface module.

In FIG. 7C, initially, the processor P1 issues an address request (labeled as 0AR in FIG. 7C) to the corresponding CIM 1. Once the CIM 1 receives the address request, the CIM 1 determines whether the address request is a cache hit or a cache miss in the cache 1. In the example of FIG. 7C, the address request results in a cache miss in the cache 1 (e.g., illustrated as 1 cache miss in FIG. 7C). While the CIM 1 determines whether the address request is a cache hit or a cache miss in the cache 1, the CIM 1 also transmits the address request to the home interface module CIM 3 (e.g., illustrated as 1AR and 2AR in FIG. 7C). Thus, in FIG. 7C, the CIM 1 transmits the address request to the CIM 3 irrespective of whether the address request results in a cache hit or a cache miss in the cache 1.

In the example of FIG. 7C, the address request also results in a cache miss in the cache 3 (e.g., illustrated as 3 cache hit in FIG. 7C), along with a DSF miss and RLD miss. The CIM 3 transmits a response to the CIM 1 (e.g., illustrated as 4Resp and 5Resp in FIG. 7C), indicating that the address request resulted in a cache miss in the cache 3.

As the address request resulted in a cache miss in caches of both the local interface module and the home interface module, the CIM 1 then transmits the address request to (i) one or more other caches of the local ring 0 (e.g., to caches of all the interface modules of the local ring 0, except the local interface module and the home interface module), and (ii) to the memory interface module 0. For example, subsequent to receiving indication that the address request resulted in a cache miss in the cache 3, the CIM 1 transmits address requests to each of CIM 0 and CIM 2 (e.g., illustrated as 6AR and 6AR in FIG. 7C), to check if the requested data is cached in one or both of the caches 0 and 2. The address request is also transmitted to the memory interface module 0. In an embodiment, the CIM 1 initiates the transmission of the address requests to each of the CIM 0 and CIM 2 at least in part simultaneously. In an example, the address request is transmitted to the memory interface module 0 via (i) the CIM 0 and (ii) the global interface module 0 (illustrated as 7AR and 8AR in FIG. 7C).

In the example of FIG. 7C, the address requests also results in a cache miss in the cache 0 (e.g., illustrated as 7 cache miss in FIG. 7C), while resulting in a cache hit in the cache 2 (e.g., illustrated as 7 cache hit in FIG. 7C). The CIM 2 reads the requested data from the cache 2 (e.g., illustrated as 8RD and 9DATA in FIG. 7C), and transmits the data read from the cache 2 to the processor P1 via the CIM 1 (e.g., illustrated as 10R and 11R in FIG. 7C).

As discussed, the address request is also transmitted to the memory interface module 0 via (i) the CIM 0 and (ii) the global interface module 0 (illustrated as 7AR and 8AR in FIG. 7C). In response to the cache miss in the cache 0, the CIM 0 transmits a response to the memory interface module 0, indicating that the address request resulted in a cache miss (illustrated as 8Resp(miss) and 9 Resp(miss) in FIG. 7C). Also, in response to the cache hit in the cache 2, the CIM 2 transmits a response to the memory interface module 0, indicating that the address request resulted in a cache hit in the cache 2 (illustrated as 8Resp(hit) and 9 Resp(hit) in FIG. 7C). Based on receiving an indication that the address request resulted in a cache hit in the cache 2, the memory interface module 0 refrains from accessing the memory 0 to fetch data corresponding to the address request (or from transmitting data pre-fetched from the memory 0 to the requesting processor).

In an embodiment, when the address request is transmitted to the memory interface module 0 (e.g., by the CIM 0, indicated by 7AR and 8AR in FIG. 7C), the address request includes a number of responses that will follow the address request. For example, in FIG. 7C, based on the cache miss in caches 1 and 3 (i.e., caches associated with the local and home interface modules), there are two other caches (e.g., caches 0 and 2) that are to be checked. Thus, two responses indicating hit or miss (e.g., from the two caches 0 and 2) is to be received by the memory interface module 0, subsequent to receiving the address request. Thus, the address requested received by the memory interface module 0 indicate that two responses will follow the address request. Once the memory interface module 0 receives the address request, the memory interface module 0 waits to receive the two responses (e.g., and while waiting, in an embodiment, the memory interface module 0 can pre-fetch the requested data form the memory 0). If at least one of the two responses received by the memory interface module 0 indicates a hit, the memory interface module 0 discards the address request. For example, in FIG. 7C, one of the responses (e.g., response from the CIM 2) is a hit—accordingly, the memory interface module 0 discards the address request. However, as discussed herein later with respect to FIG. 7D, if both the responses are miss, the memory interface module 0 access the memory 0 (e.g., if the memory interface module 0 has not already pre-fetched the requested data), and transmits the fetched data from the memory 0 to the requesting processor.

Figure 7D:
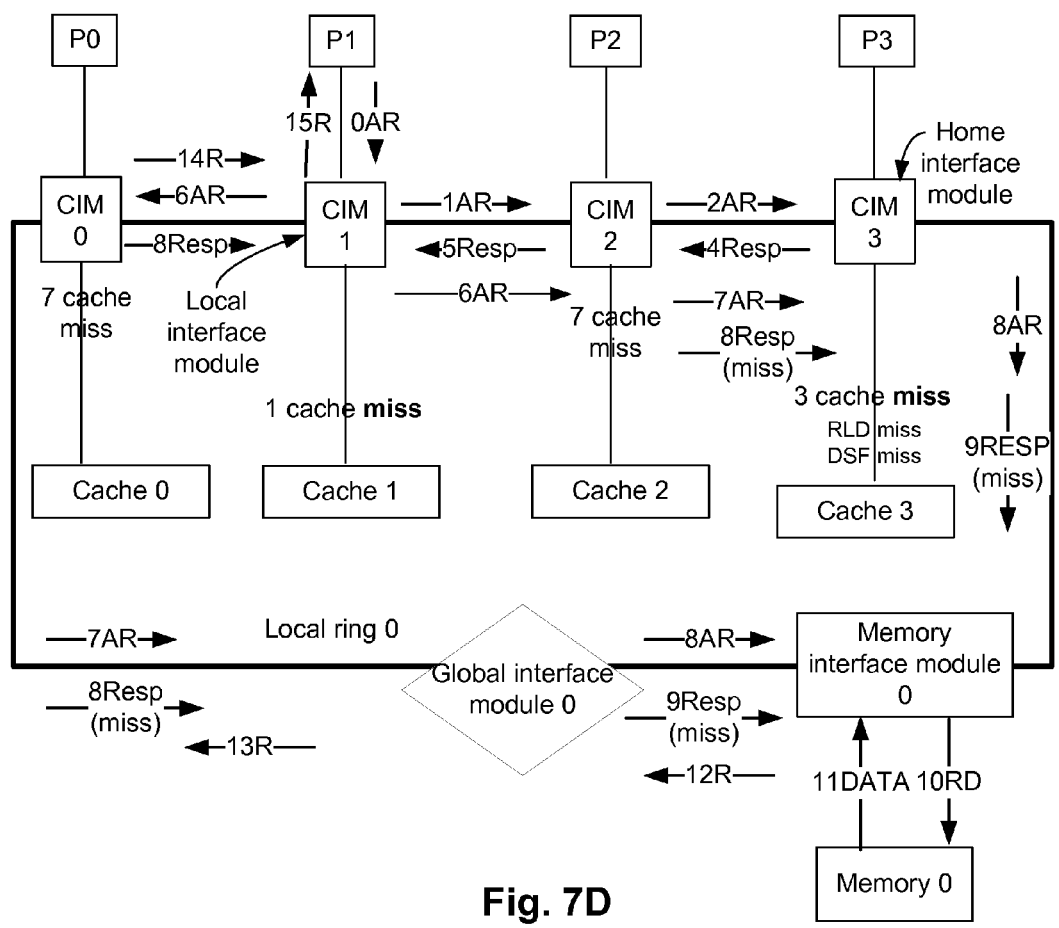

FIG. 7D illustrates another example read operation while a multi-core processing system (e.g., the system 100 of FIG. 1) operates in the dynamic mapped cache architecture mode. As discussed, in FIG. 7A, the address request resulted in a cache hit in the cache of the local interface module, while resulting in a cache miss in the home interface module. In FIG. 7B, the address request resulted in a cache miss in the cache of the local interface module, while resulting in a cache hit in the home interface module. In FIG. 7C, the address request resulted in a cache miss in the caches of both the local interface module and the home interface module, but resulted in a cache hit in another cache of the ring 0. In the example of FIG. 7D, the address request results in a cache miss in all the caches of local ring 0, as a result on which the data is read from the memory 0.

Similar to FIGS. 7A-7C, in the example of FIG. 7D, the processor P1 initiates an address request to, for example, read data of a specific memory address of the memory 0. Also, similar to FIGS. 7A-7C, in the example of FIG. 7D, the CIM 1 is the local interface module and the CIM 3 is the home interface module.

In FIG. 7D, initially, the processor P1 issues an address request (labeled as 0AR in FIG. 7D) to the corresponding CIM 1. Once the CIM 1 receives the address request, the CIM 1 determines whether the address request is a cache hit or a cache miss in the cache 1. In the example of FIG. 7D, the address request results in a cache miss in the cache 1 (e.g., illustrated as 1 cache miss in FIG. 7D). While the CIM 1 determines whether the address request is a cache hit or a cache miss in the cache 1, the CIM 1 also transmits the address request to the home interface module CIM 3 (e.g., illustrated as 1AR and 2AR in FIG. 7D). In the example of FIG. 7D, the address request also results in a cache miss in the cache 3 (e.g., illustrated as 3 cache hit in FIG. 7D). The CIM 3 transmits a response to the CIM 1 (e.g., illustrated as 4Resp and 5Resp in FIG. 7D), indicating that the address request resulted in a cache miss in the cache 3.

As the address request resulted in a cache miss in caches of both the local interface module and the home interface module, the CIM 1 transmits the address request to one or more other caches of the local ring 0 (e.g., to caches of all the interface modules of the local ring 0, except the local interface module and the home interface module). For example, subsequent to receiving the indication that the address request resulted in a cache miss in the cache 3, the CIM 1 transmits address requests to each of the CIM 0 and CIM 2 (e.g., illustrated as 6AR and 6AR in FIG. 7D), to check if the requested data is cached in one or both of the caches 0 and 2. In an embodiment, the CIM 1 transmits the address requests to each of the CIM 0 and CIM 2 at least in part simultaneously. The address request is also transmitted to the memory interface module 0 (e.g., illustrated as 7AR and 8AR in FIG. 7D). In the example of FIG. 7D, the address requests also results in a cache miss in both the caches 0 and 1 (e.g., illustrated as 7 cache miss in FIG. 7D).

As the address request results in a cache miss in all the caches of the local ring 0, the requested data is fetched from the memory 0. For example, while the CIM 0 checks for a cache hit or a cache miss, the CIM 0 also transmits the address request to the memory interface module 0, e.g., to pre-fetch data, in case of a cache miss (e.g., illustrated as 7AR and 8AR in FIG. 7D). Subsequent to determining that the address request is a cache miss, the CIM 0 also transmits a response to the memory interface module 0, indicating that the address request is a cache miss in the cache 0 (e.g., illustrated as 8Resp(miss) and 9Resp(miss) in FIG. 7D). Similarly, the CIM 2 also transmits a response to the memory interface module 0, indicating that the address request is a cache miss in the cache 2 (also illustrated as 8Resp(miss) and 9Resp(miss) in FIG. 7D).

As previously discussed with respect to FIG. 7C, the address request received by the memory interface module 0 in FIG. 7D also indicates that two responses (e.g., from CIMs 0 and 2) will follow the address request. Once the memory interface module 0 receives the two cache miss indication (e.g., from the CIM 0 and the CIM 2), the memory interface module 0 fetches the requested data from the memory 0 (e.g., illustrated as 10RD and 11DATA in FIG. 7D). The memory interface module 0 then transmits the data fetched from the memory 0 to the processor P1, e.g., via the global interface module 0, the CIM 0 and the CIM 1 (e.g., illustrated as 12R, . . . , 15R in FIG. 7D).

Although FIGS. 7A-7D illustrate checking the caches of only the local ring 0 to determine if the address request is a cache hit or a cache miss, in an embodiment, caches of another local ring (e.g., a local ring 1 interconnected to the local ring 0 via a global ring) can also be checked, e.g., in case all the caches of the local ring 0 results in a cache miss. Thus, in such an embodiment, access to a cache in the local ring 1 is performed via the global ring. In an embodiment, a cache associated with a local interface module of the local ring 1 is checked first, prior to checking other caches of the local ring 1.

Figure 7E:
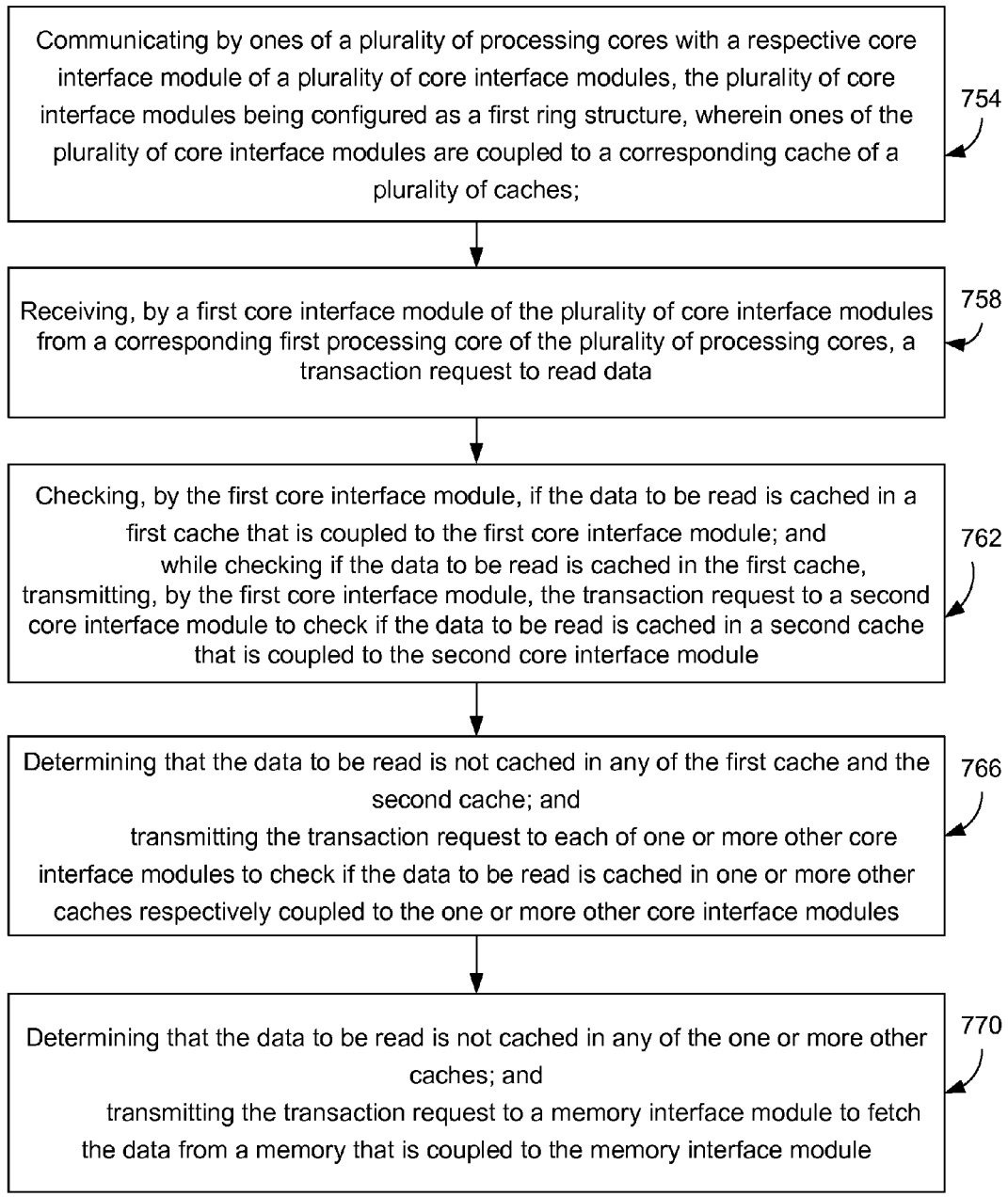
FIG. 7E is a flow diagram illustrating an example method for a read operation while a multi-core processing system operates in the dynamic mapped cache architecture mode.

FIG. 7E is a flow diagram illustrating an example method 750 for a read operation while a multi-core processing system (e.g., the systems illustrated in FIGS. 7A-7D) operates in the dynamic mapped cache architecture mode.

At 754, ones of a plurality of processing cores (e.g., processors P0, . . . , P3 of FIGS. 7A-7D) communicates with a respective core interface module of a plurality of core interface modules (e.g., CIMs 0, . . . , 3), the plurality of core interface modules being configured as a first ring network, wherein ones of the plurality of core interface modules are coupled to a corresponding cache of a plurality of caches (e.g., caches 0, . . . , 3).

At 758, by a first core interface module (e.g., CIM 1 of FIG. 7D) of the plurality of core interface modules receives from a corresponding first processing core (e.g., processor P1) of the plurality of processing cores, a transaction request to read data.

At 762, the first core interface module checks to determine if the data to be read is cached in a first cache (e.g., cache 1) that is coupled to the first core interface module; and while checking if the data to be read is cached in the first cache, the first core interface module transmits the transaction request to a second core interface module (e.g., CIM 3 of FIG. 7D, which is the home interface module) to check if the data to be read is cached in a second cache (e.g., cache 3) that is coupled to the second core interface module.

At 766, it is determined that the data to be read is not cached in any of the first cache and the second cache (e.g., illustrated as 1 cache miss and 3 cache miss in FIG. 7D).

Accordingly, the transaction request is transmitted to each of one or more other core interface modules (e.g., CIMs 0 and 2) of the first ring network to check if the data to be read is cached in one or more other caches (e.g., caches 0 and 2) respectively coupled to the one or more other core interface modules.

At 770, it is determined that the data to be read is not cached in any of the one or more other caches e.g., illustrated as 7 cache miss in FIG. 7D). Accordingly, the transaction request is transmitted to a memory interface module (e.g., memory interface module 0 of FIG. 7D) to fetch the data from a memory (e.g., memory 0) that is coupled to the memory interface module.

In an embodiment, the system operates in any one of the static mapped cache architecture mode or the dynamic mapped cache architecture mode. In an example, the static mapped cache architecture mode is relatively less complex to implement than implementing the dynamic mapped cache architecture mode. In an example, a penalty for a cache miss in the dynamic mapped cache architecture mode can be higher in terms of power consumption and latency than a miss penalty in the static mapped cache architecture mode. However, in an example, in view of the above discussed heuristic algorithm, the dynamic mapped cache architecture mode can provide relatively better latency and better bandwidth compared to the static mapped cache architecture mode. In an embodiment, whether the system 100 operates in the static mapped cache architecture mode or the dynamic mapped cache architecture mode is configurable. For example, a parameter of the system 100 is configured to selectively operate the system 100 in one of the static mapped cache architecture mode or the dynamic mapped cache architecture mode. In another example, whether the system 100 operates in the static mapped cache architecture mode or the dynamic mapped cache architecture mode is based on configuration or properties of various components of the system 100. As an example, if the system 100 exhibits a relatively small memory foot print per processor (and thus, exhibit high hit ratio in the caches) and a relatively high affinity between memory and the processor, the system 100 operates in the dynamic mapped cache architecture mode. In another example, if the system 100 has a memory that is relatively largely shared between various processors, the system 100 operates in the dynamic mapped cache architecture mode.

Combining Memory Access Requests

Figure 8:
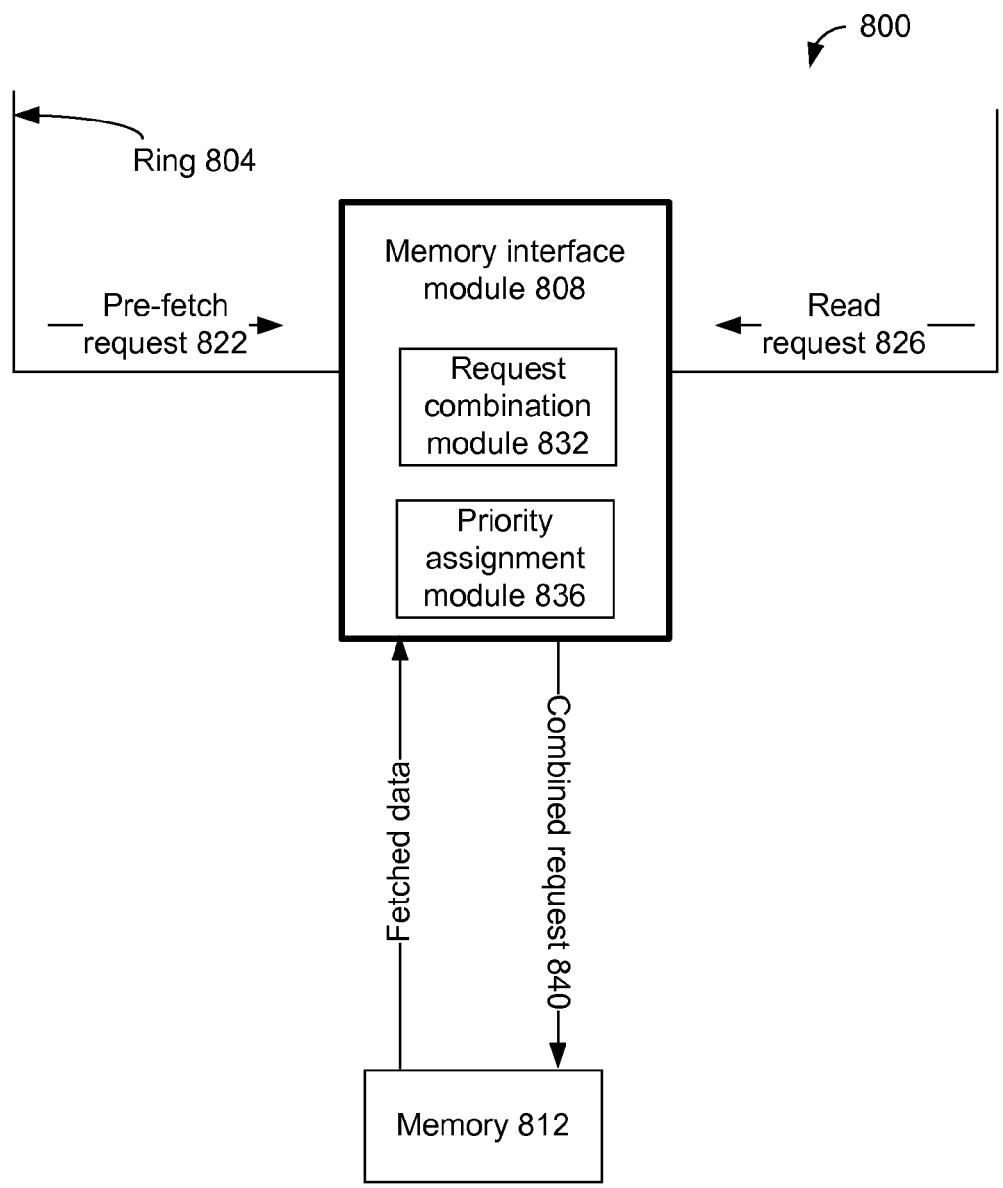
FIG. 8 illustrates a system for combining a plurality of memory access requests.

FIG. 8 illustrates a system 800 for combining a plurality of memory access requests. The system 800 comprises a memory interface module 808 coupled to a local ring 804. The memory interface module 808 is also coupled to a memory 812. In an embodiment, the ring 804, the memory interface module 808 and the memory 812 are similar to the corresponding components of the system 100 of FIG. 1 (or corresponding components of FIGS. 6A-6D and 7A-7D). For example, the ring 804, the memory interface module 808 and/or the memory 812 are respectively similar to the ring 160a, the memory interface module 126a, and the memory 128a of the system 100 of FIG. 1. FIG. 8 illustrates only a part of the ring 804, and various components coupled to the ring (e.g., as discussed with respect to FIG. 1) are not illustrated in FIG. 8. In an embodiment, the memory interface module 808 acts as a memory controller for the memory 812, by controlling access to the memory 812.

The memory interface module 808 receives a stream of memory requests. Some of these requests are memory access requests, e.g., to read data from various memory addresses of the memory 812. For example, the memory interface module 808 receives a pre-fetch request 822 to pre-fetch data from an address of the memory 812. For example, the pre-fetch request 822 is issued by a processor, prior to the processor actually needing the data. For example, the processor issues the pre-fetch request 822, speculating that the requested data may be needed some time soon. In an embodiment, the pre-fetch request 822 is a speculative read request, e.g., to read data from the memory 812 based on a speculation that the data might be needed in near future (for example, based on a processor processing a first data, the processor speculates that a second data may be needed in near future by the processor).

The memory interface module 808 also receives a read request 826 to fetch data from an address of the memory 812. For example, the read request 826 is issued by a processor, when the processor wants to fetch data from the address of the memory 812.

In an embodiment, the pre-fetch request 822 and the read request 826 can be received from a single component (e.g., a processor). In another embodiment, the pre-fetch request 822 and the read request 826 can be received from two different corresponding components (e.g., the pre-fetch request 822 is received from a first processor, and the read request 826 is received from a second processor).

FIG. 8 illustrates the memory interface module 808 receiving the pre-fetch request 822 over a first communication link (e.g., from a left side of the ring 804) and receiving the read request 826 over a second communication link (e.g., from a right side of the ring 804). However, in another embodiment and although not illustrated in FIG. 8, the memory interface module 808 can receive the pre-fetch request 822 and the read request 826 over a same communication link (e.g., from a same side of the ring 804).

In an embodiment, the memory interface module 808 receives the pre-fetch request 822 and the read request 826 simultaneously. Alternatively, in another embodiment, the memory interface module 808 receives the pre-fetch request 822 prior to receiving the read request 826 (e.g., the memory interface module 808 receives the read request 826 while the memory interface module 808 processes the pre-fetch request 822, receives the read request 826 while the pre-fetch request 822 is queued in the memory interface module 808 for processing, or receives the read request 826 prior to fully executing the pre-fetch request 822 by the memory interface module 808). Alternatively, in yet another embodiment, the memory interface module 808 receives the pre-fetch request 822 subsequent to receiving the read request 826 (e.g., the memory interface module 808 receives the pre-fetch request 822 while the memory interface module 808 processes the read request 826, receives the pre-fetch request 822 while the read request 826 is queued in the memory interface module 808 for processing, or receives the pre-fetch request 822 prior to fully executing the read request 826 by the memory interface module 808).

In an embodiment, each of the read request 826 and the pre-fetch request 822 are issued to read data from a same memory address of the memory 812. As an example, each of the read request 826 and the pre-fetch request 822 aims to read data from a first memory address of the memory 812.

In an embodiment, the memory interface module 808 comprises a request combination module 832 and a priority assignment module 838. In an embodiment, the request combination module 832 determines that (i) both the read request 826 and the pre-fetch request 822 are currently pending in the memory interface module 808 for execution, and (ii) each of the read request 826 and the pre-fetch request 822 are issued to read data from a same memory address of the memory 812. In an embodiment, based on such determination, the request combination module 832 combines the read request 826 and the pre-fetch request 822. For example, the request combination module 832 generates a combined request 840 to fetch data from the memory 812, and reads data from the memory 812. In an embodiment, once the requested data is read form the memory 812, the memory interface module 808 transmits the data read form the memory 812 to the initiators of the read request 826 and the pre-fetch request 822, thereby completing the processing of the read request 826 and the pre-fetch request 822. In an embodiment, the combined request 840 comprises the read request 826, and fetching of data in response to the pre-fetch request 822 is not executed. In an embodiment, the combined request 840 comprises a request to fetch data from the memory 812.

Thus, if the read request 826 and the pre-fetch request 822 were to be executed separately (that is, if the read request 826 and the pre-fetch request 822 were not combined by the request combination module 832), the memory interface module 808 would have needed to access the memory 812 twice, to read the same data twice from the same memory address of the memory 812 (in other words once for processing the read request 826, and once for processing the pre-fetch request 822). However, by combining the read request 826 and the pre-fetch request 822, the memory interface module 808 needs to access the memory 812 only once while processing the read request 826 and the pre-fetch request 822.

In an embodiment, a request to access the memory 812 has a corresponding associated priority (for example, a pre-defined priority based on a type of the request). For example, a read request (e.g., the read request 826) received by the memory interface module 808 has a first priority, and a pre-fetch request (e.g., the pre-fetch request 822) received by the memory interface module 808 has a second priority. In an embodiment, the first priority is higher than the second priority. That is, if a read request having the first priority is residing in the memory interface module 808 for processing along with a pre-fetch request, the read request is to be executed prior to an execution of the pre-fetch request (e.g., due to the first priority being higher than the second priority). Thus, the first priority being higher than second priority implies that the read request has a higher execution priority compared to the pre-fetch request.

As discussed, in an example, the read request 826 received by the memory interface module 808 has the first priority, and the pre-fetch request 822 received by the memory interface module 808 has the second priority. In an embodiment, the priority assignment module 838 assigns a third priority to the combined request 840. In an embodiment, the third priority is a higher of the first priority and the second priority. In an example, the first priority is higher than the second priority, and hence, the third priority is equal to the first priority.

In an embodiment, as a higher priority (e.g., the first priority) is assigned to the combined request 840, the combined request 840 is executed by the memory interface module 808 prior to execution of, for example, various other pre-fetch requests residing in the memory interface module 808.

Figure 9:
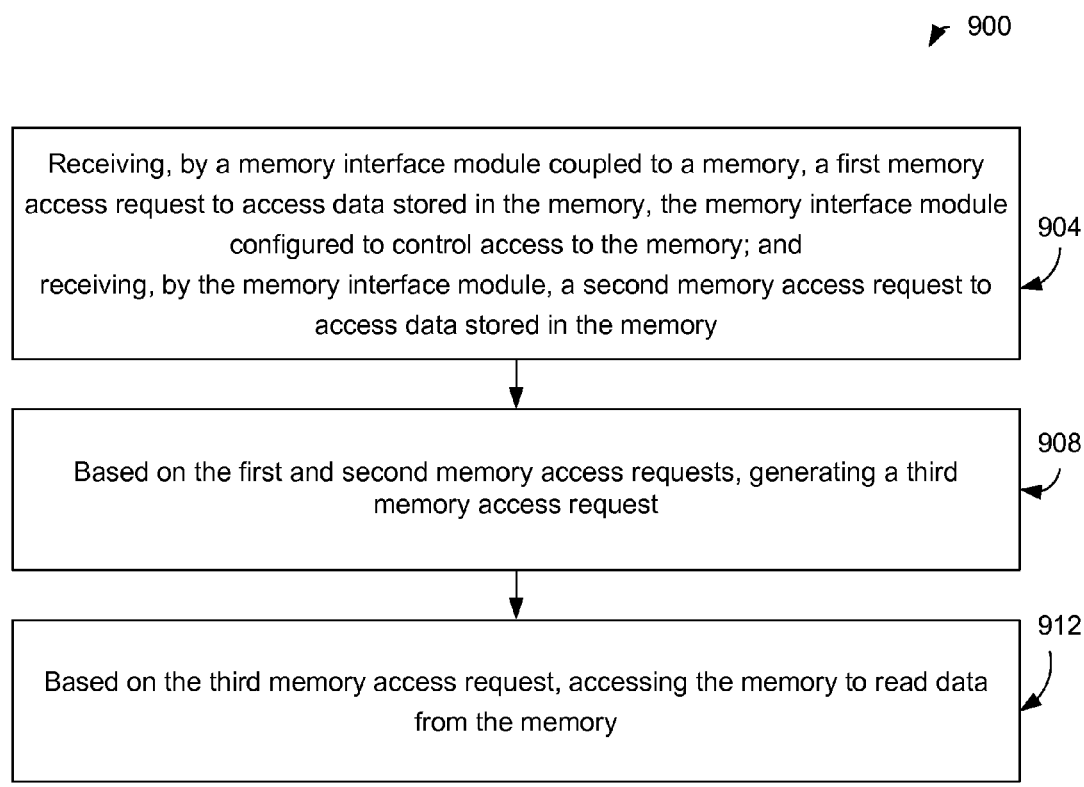
FIG. 9 is a flow diagram illustrating an example method for operating the system of FIG. 8.

FIG. 9 is a flow diagram illustrating an example method 900 for operating the system 800 of FIG. 8. At 904, a memory interface module (e.g., memory interface module 808), which is coupled to a memory (e.g., memory 812), receives a first memory access request (e.g., the pre-fetch request 822) to access data stored in the memory, the memory interface module configured to control access to the memory; and the memory interface module receives a second memory access request (e.g., read request 826) to access data stored in the memory.

At 908, based on the first and second memory access requests, the memory interface module (e.g., the request combination module 832) generates a third memory access request (e.g. the combined request 840), by, for example, combining the first and second memory access requests. At 912, based on the third memory access request, the memory interface module accesses the memory to read data from the memory.

The description incorporates use of the phrases "in an embodiment," or "in various embodiments," which may each refer to one or more of the same or different embodiments. Furthermore, the terms "comprising," "including," "having," and the like, as used with respect to embodiments of the present disclosure, are synonymous.

Various operations may have been described as multiple discrete actions or operations in turn, in a manner that is most helpful in understanding the claimed subject matter. However, the order of description should not be construed as to imply that these operations are necessarily order dependent. In actuality, these operations may not be performed in the order of presentation. Operations described may be performed in a different order than the described embodiment. Various additional operations may be performed and/or described operations may be omitted in additional embodiments.

Although specific embodiments have been illustrated and described herein, it is noted that a wide variety of alternative and/or equivalent implementations may be substituted for the specific embodiment shown and described without departing from the scope of the present disclosure. The present disclosure covers all methods, apparatus, and articles of manufacture fairly falling within the scope of the appended claims either literally or under the doctrine of equivalents. This application is intended to cover any adaptations or variations of the embodiment disclosed herein. Therefore, it is manifested and intended that the present disclosure be limited only by the claims and the equivalents thereof.

What is claimed is:

1. A system comprising:
 a memory;
 a first plurality of core interface modules arranged in a first ring network, wherein ones of the first plurality of core interface modules are coupled to a respective one of a first plurality of caches, wherein the first plurality of core interface modules comprises a first core interface module coupled to a first cache of the first plurality of caches; and
 a second plurality of core interface modules arranged in a second ring network, wherein ones of the second plurality of core interface modules are coupled to a respective one of a second plurality of caches, and wherein the second plurality of core interface modules comprises a second core interface module coupled to a second cache of the second plurality of caches,
 wherein the first core interface module is configured to:
  receive a transaction request to read data that is stored in a first memory address of the memory, and
  in response to (i) the first core interface module being a first home interface module in the first ring network for the first memory address of the memory and (ii)

the second core interface module being a second home interface module in the second ring network for the first memory address of the memory, check the first cache of the first plurality of caches and the second cache of the second plurality of caches for the data, without checking any other cache of the first and second plurality of caches to determine if the data is stored therein.

2. The system of claim 1, further comprising:
a memory interface module that is included in the second ring network,
wherein the memory is coupled, via the memory interface module, to the second ring network, and
wherein the first core interface module is further configured to, in response to the data not being stored in the first cache and the second cache, transmit a request to the memory interface module to read the data from the memory, without checking any other cache of the first and second plurality of caches to determine if the data is stored therein.

3. The system of claim 1, wherein the first core interface module is further configured to:
in response to the data being stored in one of the first cache or the second cache,
(i) receive, by the first core interface module, the data from one of the first cache or the second cache, and
(ii) transmit the received data to a first processing core coupled to the first core interface module.

4. The system of claim 1, wherein the memory is a first memory that is coupled to the second ring network, wherein the data is a first data, wherein the transaction request is a first transaction request, and wherein the system further comprises:
a second memory coupled to the first ring network,
wherein the first core interface module is further configured to:
receive a second transaction request to read second data that is stored in a second memory address of the second memory, and
in response to the first core interface module being a home interface module in the first ring network for the second memory address of the second memory that is coupled to the first ring network, check the first cache of the first plurality of caches, without checking (i) any other cache of the first plurality of caches and (ii) any cache of the second plurality of caches, to determine if the second data is stored therein.

5. The system of claim 4, wherein the first core interface module is further configured to:
in response to the second data not being stored in the first cache of the first plurality of caches, transmit a request to the second memory to read the second data from the second memory, without checking (i) any other cache of the first plurality of caches and (ii) any cache of the second plurality of caches to determine if the second data is stored therein.

6. The system of claim 1, further comprising:
a first plurality of processing cores, ones of the first plurality of processing cores coupled to a respective core interface module of the first plurality of core interface modules, ones of the first plurality of core interface modules configured to interface the respective processing core of the first plurality of processing cores to the first ring network by transmitting data between the respective processing core and the first ring network.

7. The system of claim 6, further comprising:
a second plurality of processing cores, ones of the second plurality of processing cores coupled to a respective core interface module of the second plurality of core interface modules, ones of the second plurality of core interface modules configured to interface the respective processing core of the second plurality of processing cores to the second ring network by transmitting data between the respective processing core and the second ring network.

8. The system of claim 1, further comprising:
a global ring network configured to interface between the first ring network and the second ring network.

9. The system of claim 8, wherein the first core interface module is configured to check the second cache for the data by transmitting the transaction request to the second core interface module via the first ring network, the global ring network, and the second ring network.

10. The system of claim 1, wherein the first core interface module is further configured to:
determine that the second core interface module is the second home interface module in the second ring network for the first memory address of the memory by:
determining that the second core interface module stores information associated with maintaining cache coherency of data stored in the first memory address of the memory among a plurality of caches coupled to the first and second ring networks, and
in response to determining that the second core interface module stores information associated with maintaining cache coherency of data stored in the first memory address of the memory, determining that the second core interface module is the second home interface module for the first memory address of the memory.

11. A method for operating a system that comprises (i) a first plurality of core interface modules, (ii) a second plurality of core interface modules, and (iii) a memory, ones of the first plurality of core interface modules being coupled to a respective one of a first plurality of caches, ones of the second plurality of core interface modules being coupled to a respective one of a second plurality of caches, the first plurality of core interface modules arranged in a first ring network, the first plurality of core interface modules comprising a first core interface module coupled to a first cache of the first plurality of caches, the second plurality of core interface modules arranged in a second ring network, the second plurality of core interface modules comprising a second core interface module coupled to a second cache of the second plurality of caches, the method comprising:
receiving, by the first core interface module, a transaction request to read data; and
in response to (i) the first core interface module being a first home interface module in the first ring network for a first memory address of the memory and (ii) the second core interface module being a second home interface module in the second ring network for the first memory address of the memory, checking the first cache of the first plurality of caches and the second cache of the second plurality of caches for the data, without checking any other cache of the first and second plurality of caches to determine if the data is stored therein.

12. The method of claim 11, wherein the memory is coupled, via a memory interface module, to the second ring network, and wherein the method further comprises:

in response to the data not being stored in the first cache and the second cache, transmitting a request to the memory interface module to read the data from the memory, without checking any other cache of the first and second plurality of caches to determine if the data is stored therein.

13. The method of claim 11, further comprising:
in response to the data being stored in one of the first cache or the second cache,
   (i) receiving, by the first core interface module, the data from one of the first cache or the second cache, and
   (ii) transmitting the received data to a first processing core coupled to the first core interface module.

14. The method of claim 11, wherein the memory is a first memory that is coupled to the second ring network, wherein the data is a first data, wherein the transaction request is a first transaction request, wherein the system further comprises a second memory coupled to the first ring network, and wherein the method further comprises:
   receiving, by the first core interface module, a second transaction request to read second data that is stored in a second memory address of the second memory, and
   in response to the first core interface module being a home interface module in the first ring network for the second memory address of the second memory that is coupled to the first ring network, checking the first cache of the first plurality of caches, without checking (i) any other cache of the first plurality of caches and (ii) any cache of the second plurality of caches, to determine if the second data is stored therein.

15. The method of claim 14, further comprising:
in response to the second data not being stored in the first cache of the first plurality of caches, transmitting a request to the second memory to read the second data from the second memory, without checking (i) any other cache of the first plurality of caches and (ii) any cache of the second plurality of caches to determine if the second data is stored therein.

16. The method of claim 11, wherein the system further comprises a first plurality of processing cores, ones of the first plurality of processing cores coupled to a respective core interface module of the first plurality of core interface modules, and wherein the method further comprises:
   interfacing, by ones of the first plurality of core interface modules, the respective processing core of the first plurality of processing cores to the first ring network by transmitting data between the respective processing core and the first ring network.

17. The method of claim 16, wherein the system further comprises a second plurality of processing cores, ones of the second plurality of processing cores coupled to a respective core interface module of the second plurality of core interface modules, and wherein the method further comprises:
   interfacing, by ones of the second plurality of core interface modules, the respective processing core of the second plurality of processing cores to the second ring network by transmitting data between the respective processing core and the second ring network.

18. The method of claim 11, further comprising:
interfacing, by a global ring network, between the first ring network and the second ring network.

19. The method of claim 18, further comprising:
checking, by the first core interface module, the second cache for the data by transmitting the transaction request to the second core interface module via the first ring network, the global ring network, and the second ring network.

20. The method of claim 11, further comprising:
determining, by the first core interface module, that the second core interface module is the second home interface module in the second ring network for the first memory address of the memory by:
   determining that the second core interface module stores information associated with maintaining cache coherency of data stored in the first memory address of the memory among a plurality of caches coupled to the first and second ring networks, and
   in response to determining that the second core interface module stores information associated with maintaining cache coherency of data stored in the first memory address of the memory, determining that the second core interface module is the second home interface module for the first memory address of the memory.

* * * * *